US006274728B1

(12) United States Patent
Hall-Goulle et al.

(10) Patent No.: US 6,274,728 B1
(45) Date of Patent: Aug. 14, 2001

(54) SOLUBLE CHROMOPHORES HAVING IMPROVED SOLUBILIZING GROUPS

(75) Inventors: Véronique Hall-Goulle, Bern; Aline Bize, Marsens, both of (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/465,868

(22) Filed: Dec. 16, 1999

Related U.S. Application Data

(63) Continuation of application No. 09/013,659, filed on Feb. 26, 1998, now abandoned.

(30) Foreign Application Priority Data

Jan. 27, 1997 (CH) .................................................. 171/97

(51) Int. Cl.$^7$ .......................... C09B 47/04; C07D 209/77; C07D 221/18; C07D 403/02; C07D 471/04; C07D 487/22
(52) U.S. Cl. .......................... 540/130; 548/453; 548/460; 548/306.4; 552/212; 560/26; 430/342; 430/343; 347/212; 106/493; 106/494; 106/495; 106/496; 106/497; 106/498; 534/732; 534/733; 540/122; 544/74; 544/75; 544/76; 544/77; 544/125; 544/144; 544/296; 544/300; 544/333; 546/37; 546/38; 546/49; 546/57; 546/154; 546/167; 546/174
(58) Field of Search ........................... 540/130; 544/77, 544/340; 546/37, 57, 154, 167, 174; 548/306.4, 453, 460; 552/212; 560/27; 430/342, 343; 347/212; 106/493, 494, 495, 496, 497, 498

(56) References Cited

U.S. PATENT DOCUMENTS

| | | | |
|---|---|---|---|
| 5,243,052 | 9/1993 | Taylor et al. | 546/154 |
| 5,484,943 | 1/1996 | Zambounis et al. | 548/453 |
| 5,518,539 | 5/1996 | Hao et al. | 106/495 |
| 5,561,232 | 10/1996 | Hao et al. | 546/14 |
| 5,616,725 | 4/1997 | Zambounis et al. | 548/453 |
| 5,723,626 | 3/1998 | Hao et al. | 548/467 |

FOREIGN PATENT DOCUMENTS 0 654 711    5/1995   (EP) .

*Primary Examiner*—Richard L. Raymond
(74) *Attorney, Agent, or Firm*—David R. Crichton

(57) ABSTRACT

Compounds of formula $$A(B)_x \quad (I),$$

wherein
x is an integer from 1 to 8,
A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series that is bonded to x groups B via one or more hetero atoms, those hetero atoms being selected from the group consisting of N, O and S and forming part of the radical A,
each group B independently of any other(s) is hydrogen or a group of the formula

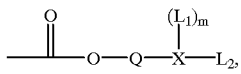

at least one group B being a group of the formula

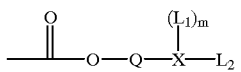

The compounds according to the invention are used in high-molecular-weight organic materials, thermo-, photo- or chemo-sensitive recording materials, light-sensitive negative or positive resist compositions, ink compositions for ink-jet printing and color tapes for thermal transfer printing.

12 Claims, No Drawings

SOLUBLE CHROMOPHORES HAVING IMPROVED SOLUBILIZING GROUPS

This is a continuation of application Ser. No. 09/013,659, filed on Jan. 26, 1998, now abandoned.

The present Application relates to novel soluble chromophores having removable solubilising oxy-, thio- or amino-alkylene-oxycarbonyl groups. Those compounds have improved properties, especially a surprisingly higher solubility. In dissolved form those chromophores can be incorporated very readily into substrates in high concentrations and can then be converted back into the corresponding insoluble pigments with an especially high degree of conversion. Those groups can also be introduced into chromophores that cannot be reacted, or react only unsatisfactorily, with known groups.

EP 648 770 and EP 648 817 disclose soluble, carbamate-group-containing chromophores that can be converted into the corresponding pigments by heating to relatively high temperatures, which results in the removal of the carbamate radicals. Among other numerous combinations, $C_1$–$C_4$alkylthio-$C_1$–$C_{14}$alkylenecarbamate radicals are also possible.

Quinophthalone carbonates having limited solubility are known from U.S. Pat. No. 5 243 052 and can be used in heat-sensitive registration systems.

It has now been found that soluble chromophores having markedly improved properties are obtained when oxy-, thio- or amino-alkylene-oxycarbonyl groups are used as solubilising groups.

The present invention accordingly relates to compounds of formula $$A(B)_x \qquad (I),$$

wherein x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series that is bonded to x groups B via one or more hetero atoms, those hetero atoms being selected from the group consisting of N, O and S and forming part of the radical A, each group B independently of any other(s) is hydrogen or a group of the formula

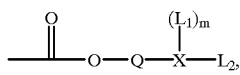, at least one group B being a group of the formula

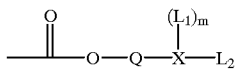

wherein

Q is p,q–$C_2$–$C_{12}$alkylene that is unsubstituted or mono- or poly-substituted by $C_1$–$C_{12}$alkoxy, $C_1$–$C_{12}$alkylthio or by $C_2$–$C_{24}$dialkylamino, p and q being different position numbers, X is a hetero atom selected from the group consisting of N, O and S, m being the number 0 when X is O or S and m being the number 1 when X is N, and $L_1$ and $L_2$ are each independently of the other [—(p',q'—$C_2$–$C_{12}$alkylene)-Z—]$_n$—$C_1$–$C_{12}$alkyl or $C_1$–$C_{12}$alkyl that is unsubstituted or mono- or poly-substituted by $C_1$–$C_{12}$alkoxy, $C_1$–$C_{12}$alkylthio, $C_2$–$C_{24}$dialkylamino, $C_6$–$C_{12}$aryloxy, $C_6$–$C_{12}$arylthio, $C_7$–$C_{24}$arylalkylamino or by $C_{12}$–$C_{24}$diarylamino, wherein n is a number from 1 to 1000, p' and q' are different position numbers, each Z independently of any other(s) is a hetero atom O, S or $C_1$–$C_{12}$alkyl-substituted N, and $C_2$–$C_{12}$alkylene in the repeating units [—$C_2$–$C_{12}$alkylene-Z—] may be identical or different, and $L_1$ and $L_2$ may be saturated or one- to ten-fold unsaturated, uninterrupted or interrupted at any desired points by from 1 to 10 groups selected from the group consisting of —(C=O)— and —$CH_4$—, and may carry no substituents or may carry from 1 to 10 further substituents selected from the group consisting of halogen, cyano and nitro, with the proviso that when —Q— is —$(CH_2)_r$—, wherein r is a number from 2 to 12, and X is S, $L_2$ may not be unsubstituted, saturated and uninterrupted $C_1$–$C_4$alkyl.

Except for in the case of phthalocyanines, A preferably has at each hetero atom bonded to x groups B at least one immediately adjacent or conjugated carbonyl group.

A is the radical of a known chromophore having the basic structure:

$A(H)_x$, such as, for example,

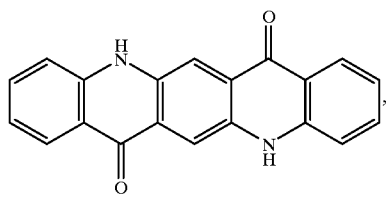

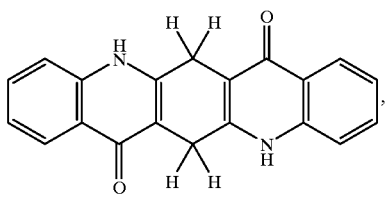

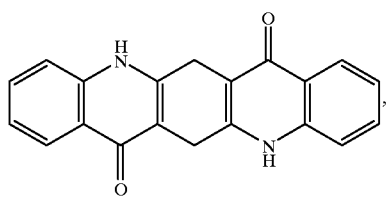
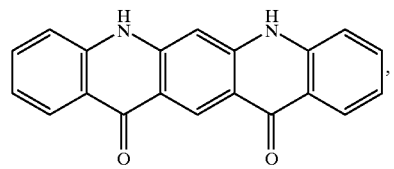
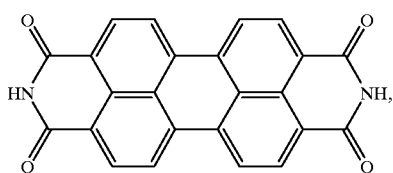
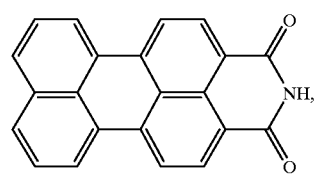
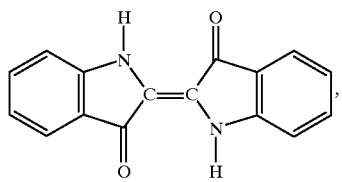
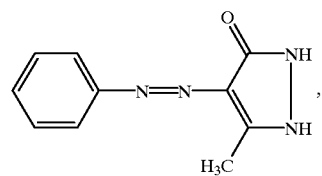
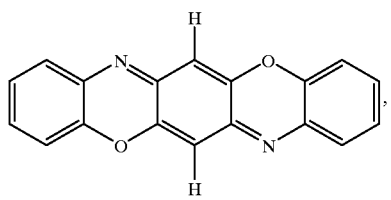
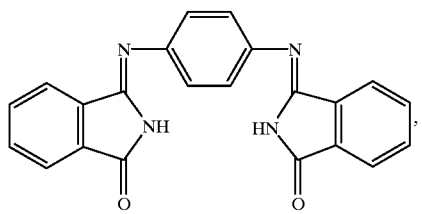
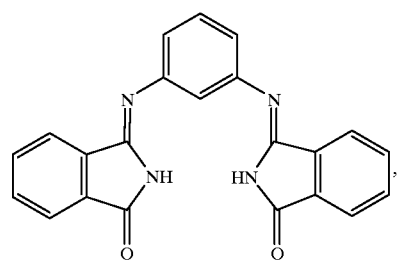
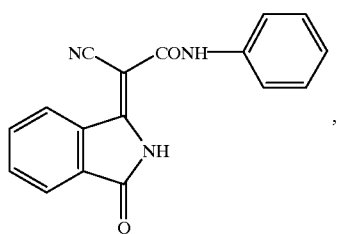
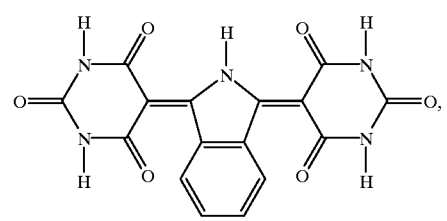
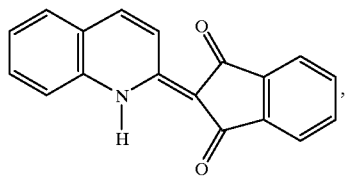
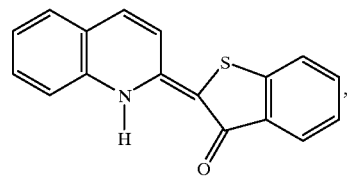
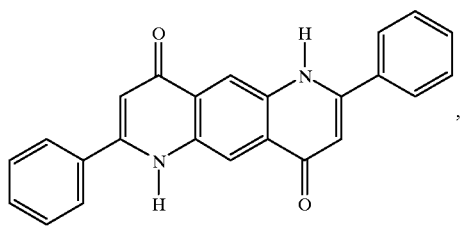
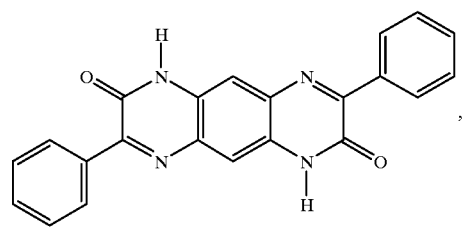

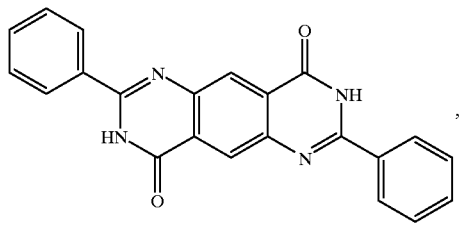
,
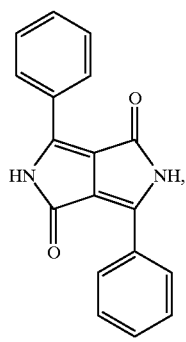
,
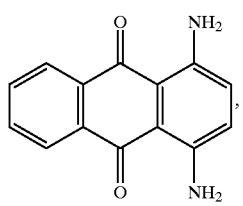
,
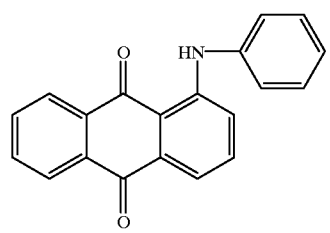
,
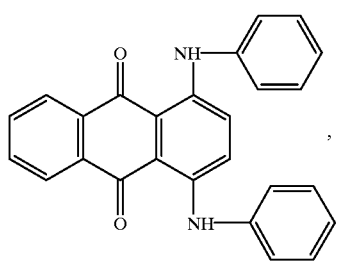
,
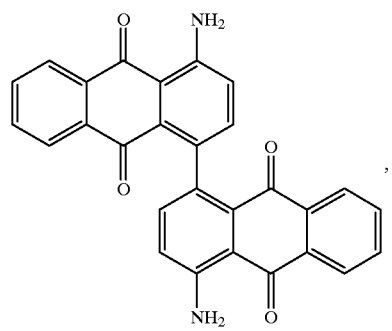
,
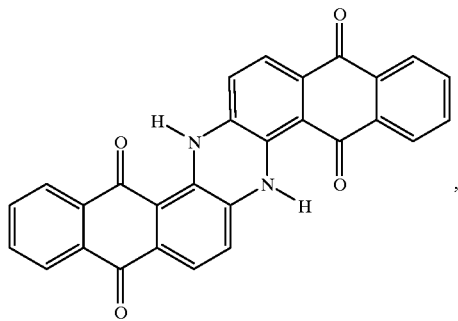
,
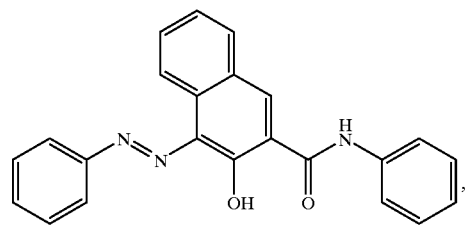
,
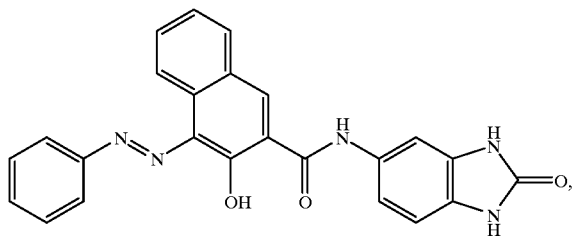
,
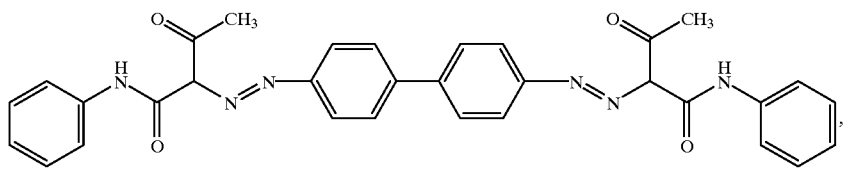
,

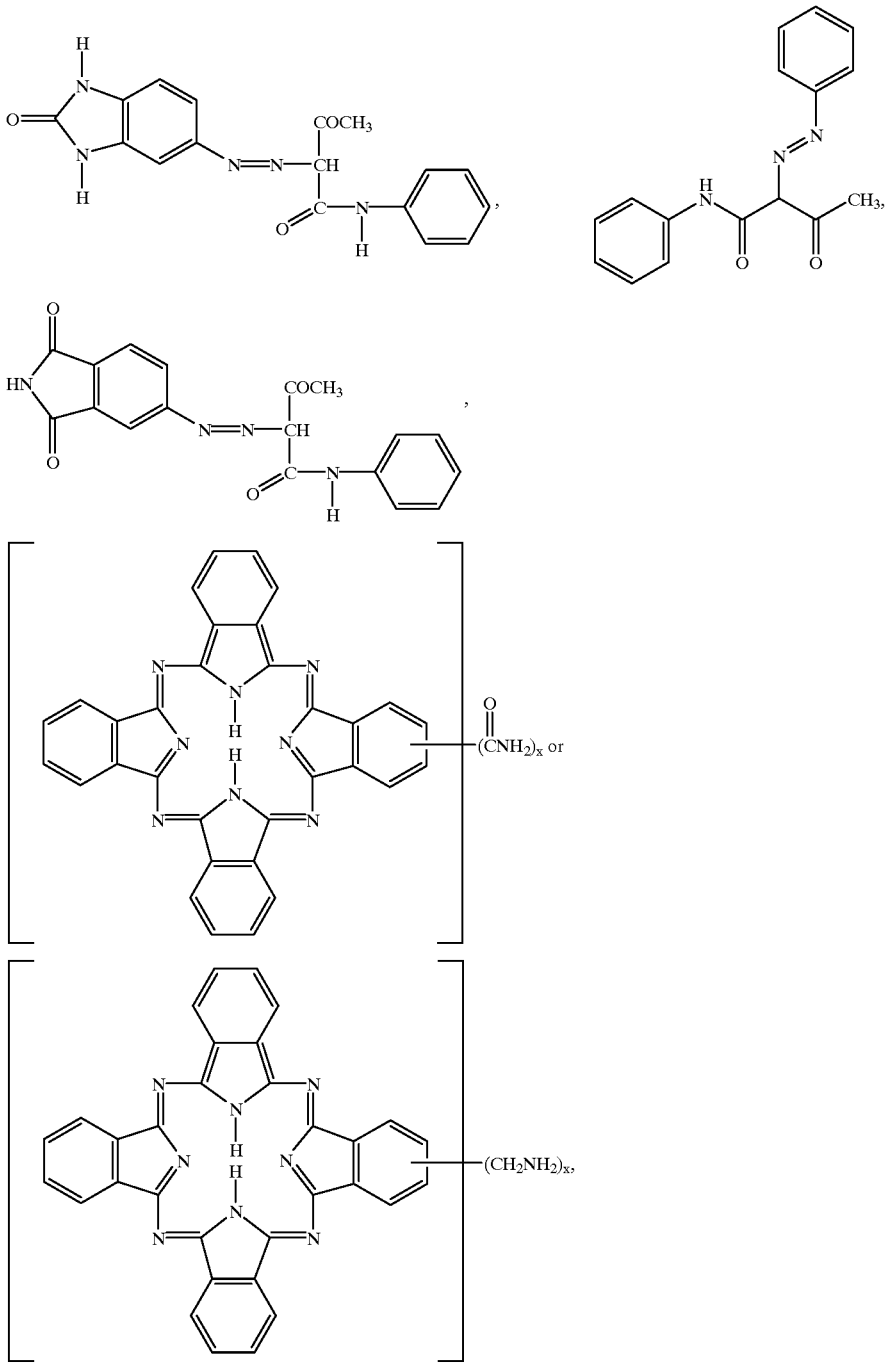

and in each case all known derivatives thereof.

Alkyl or alkylene may be straight-chain, branched, monocyclic or polycyclic.

$C_1$–$C_{12}$Alkyl is therefore, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

If $C_2$–$C_{12}$alkyl is mono- or poly-unsaturated, it is $C_2$–$C_{12}$alkenyl, $C_2$–$C_{12}$alkynyl, $C_2$–$C_{12}$alkapolyenyl or $C_2$–$C_{12}$alkapolyynyl, it being possible for two or more double bonds optionally to be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thuien-10-yl, 2-norbornen-1-yl, 2,5-norbornadien-1-yl, 7,7-dimethyl-2,4-norcaradien-3-yl or the various isomers of hexenyl, octenyl, nonenyl, decenyl or dodecenyl.

$C_2$–$C_4$Akylene is, for example, 1,2-ethylene, 1,2-propylene, 1,3-propylene, 1,2-butylene, 1,3-butylene, 2,3- butylene, 1,4-butylene or 2-methyl-1,2-propylene. $C_5$–$C_{12}$Akylene is, for example, an isomer of pentylene, hexylene, octylene, decylene or dodecylene.

$C_1$–$C_{12}$Alkoxy is O—$C_1$–$C_{12}$alkyl, preferably O—$C_1$–$C_4$alkyl.

$C_6$–$C_{12}$Aryloxy is O—$C_1$–$C_{12}$aryl, for example phenoxy or naphthoxy, preferably phenoxy.

$C_1$–$C_{12}$Alkylthio is S—$C_1$–$C_{12}$alkyl, preferably S—$C_1$–$C_4$alkyl.

$C_6$–$C_{12}$Arylthio is S—$C_6$–$C_{12}$aryl, for example phenylthio or naphthylthio, preferably phenylthio.

$C_2$–$C_{24}$Dialkylamino is N(alkyl$_1$)(alkyl$_2$), the sum of the carbon atoms in the two groups alkyl$_1$ and alkyl$_2$ being from 2 to 24, preferably N($C_1$–$C_4$alkyl)-$C_1$–$C_4$alkyl.

$C_7$–$C_{24}$Alkylarylamino is N(alkyl$_1$)(aryl$_2$), the sum of the carbon atoms in the two groups alkyl$_1$ and aryl$_2$ being from 7 to 24, for example methylphenylamino, ethylnaphthyiamino or butylphenanthrylamino, preferably methylphenylamino or ethylphenylamino.

$C_{12}$–$C_{24}$Diarylamino is N(aryl$_1$)(aryl$_2$), the sum of the carbon atoms in the two groups aryl$_1$ and aryl$_2$ being from 12 to 24, for example diphenylamino or phenylnaphthylamino, preferably diphenylamino.

Halogen is chlorine, bromine, fluorine or iodine, preferably fluorine or chlorine.

n is preferably a number from 1 to 100, especially a number from 2 to 12.

Q is preferably $C_4$–$C_{12}$alkylene in which the carbon atom bonded to the chromophore radical via oxycarbonyl is tertiary.

Special interest is accorded to compounds of formula (I) wherein Q is $C_2$–$C_4$alkylene, and to those compounds wherein $L_1$ and $L_2$ are [—$C_2$–$C_{12}$alkylene-Z—]$_n$—$C_1$–$C_{12}$alkyl or are $C_1$–$C_{12}$alkyl that is mono- or poly-substituted by $C_1$–$C_{12}$alkoxy, $C_1$–$C_{12}$alkylthio or by $C_2$–$C_{24}$dialkylamino.

Very special interest is accorded to compounds of formula (I) wherein Q is $C_2$–$C_4$alkylene, X is O, and $L_2$ is [—$C_2$–$C_{12}$alkylene-O—]$_n$—$C_1$–$C_{12}$alkyl or is $C_1$–$C_{12}$alkyl that is mono- or poly-substituted by $C_1$–$C_{12}$alkoxy, especially to those compounds wherein —Q—X— is a group of the formula —$C(CH_3)_2$—$CH_2$—O—.

Preferred compounds of formula I are:

a) perylenecarboxylic acid imides of formula

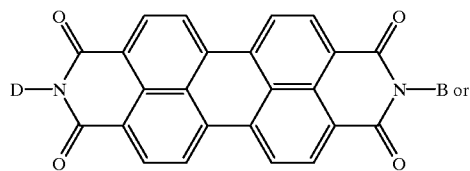

(IIa)

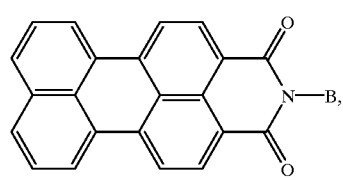

(IIb)

wherein D is hydrogen, $C_1$–$C_6$alkyl, unsubstftuted or halo- or $C_1$–$C_6$alkyl-substituted phenyl, benzyl or phenethyl, or is B, b) quinacridones of formula

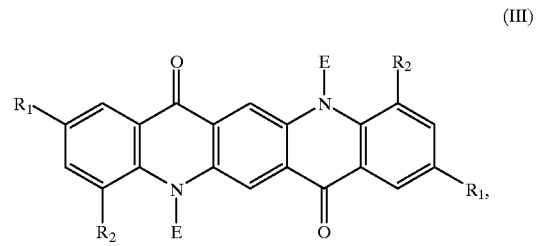

(III)

wherein $R_1$ and $R_2$ are each independently of the other hydrogen, halogen, $C_1$–$C_{24}$alkyl, $C_1$–$C_6$alkoxy or phenyl, c) dioxazines of formula

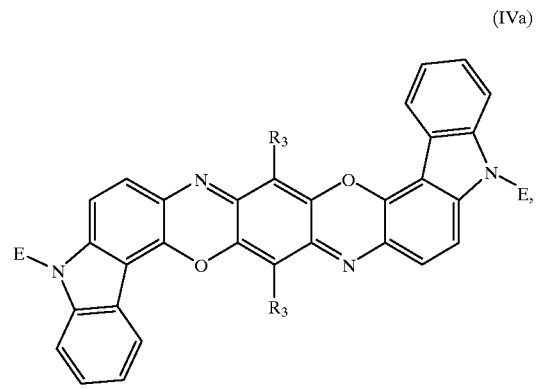

(IVa)

wherein $R_3$ is hydrogen, halogen or $C_1$–$C_{24}$alkyl, or of formula

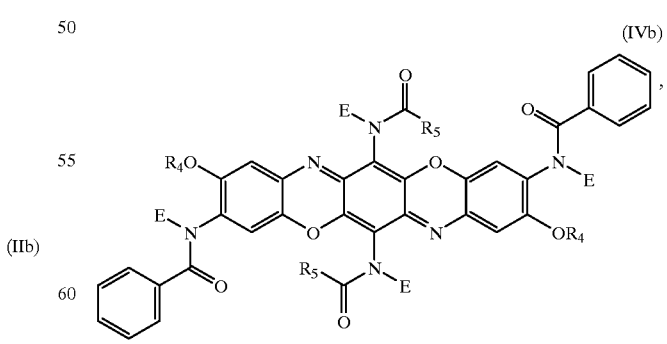

(IVb)

wherein $R_4$ and $R_5$ are each independently of the other $C_1$–$C_4$alkyl, d) isoindolines of formula

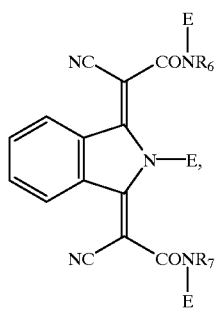
(V)

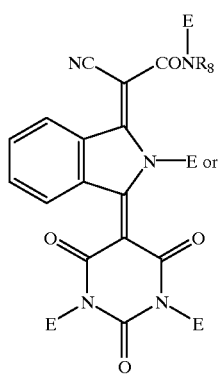
(VI)

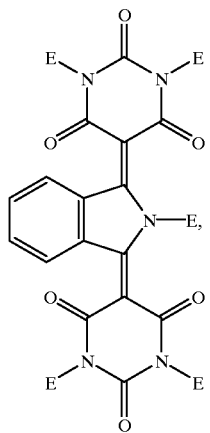
(VII)

wherein $R_6$ is a group

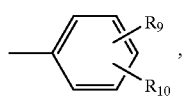

$R_7$ is hydrogen, $C_1$–$C_{24}$alkyl, benzyl or a group

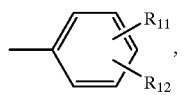

$R_8$ is hydrogen, E or $R_6$, $R_9$, $R_{10}$, $R_{11}$ and $R_{12}$ are each independently of the others hydrogen, $C_1$–$C_{24}$alkyl, $C_1$–$C_6$alkoxy, halogen or trifluoromethyl, e) indigo derivatives of formula

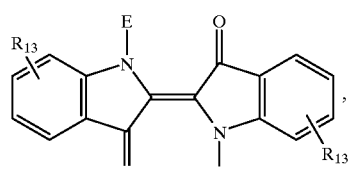
(VIII)

wherein $R_{13}$ is hydrogen, CN, $C_1$–$C_6$alkyl, $C_1$–$C_6$alkoxy or halogen, f) isoindolinones of formula

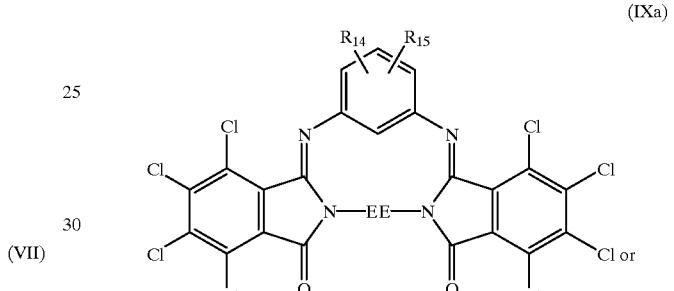
(IXa)

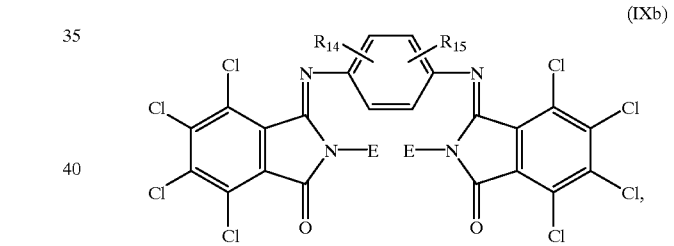
(IXb)

wherein $R_{14}$ and $R_{15}$ are each independently of the other hydrogen, halogen or $C_1$–$C_4$alkyl, g) anthraquinoid compounds of formula

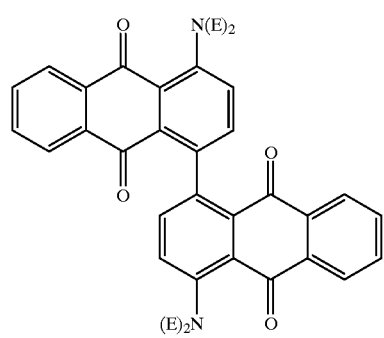
(X)

or

-continued (XI)

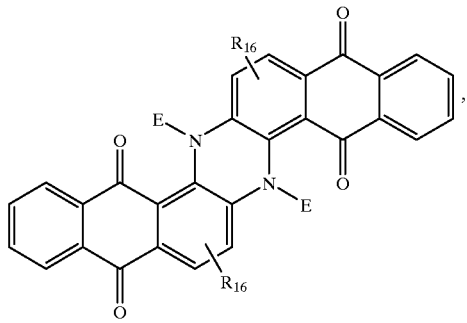

wherein $R_{16}$ is hydrogen or halogen, h) phthalocyanines of formula (XII)

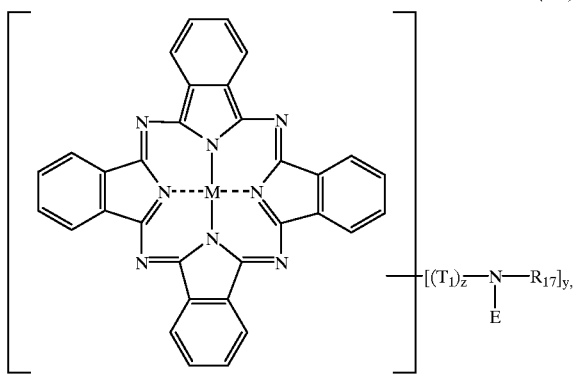

wherein

M is $H_2$, a divalent metal selected from the group Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group V(O), Mn(O) and TiO, $T_1$ is —$CHR_{18}$—, —CO— or —$SO_2$—, $R_{17}$ is hydrogen, $C_1$–$C_6$alkyl, —N(E)$R_{18}$, N(E)$_2$, —NHCOR$_{19}$, —COR$_{19}$ or

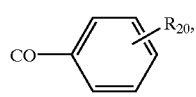

$R_{18}$ is hydrogen or $C_1$–$C_6$alkyl, $R_{19}$ is $C_1$–$C_6$alkyl and $R_{20}$ is hydrogen, halogen, $C_1$–$C_6$alkyl or $C_1$–$C_6$alkoxy, and z is zero or 1 and y is a number from 1 to 8, i) pyrrolo[3,4-c]pyrroles of formula (XIIIa)

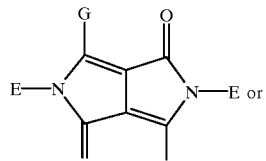

(XIIIb)

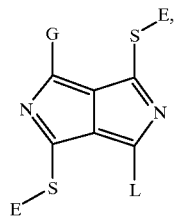

wherein G and L are each independently of the other a group of the formula

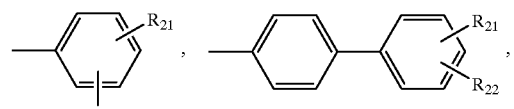

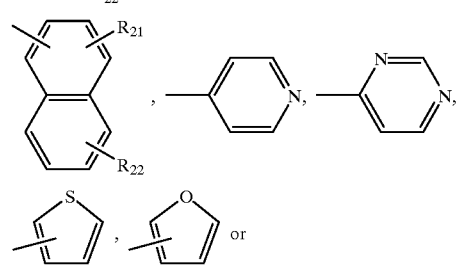

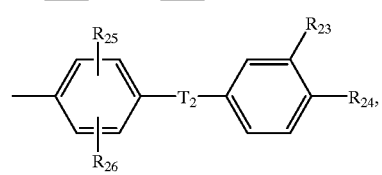

wherein $R_{21}$ and $R_{22}$ are each independently of the other hydrogen, halogen, $C_1$–$C_{24}$alkyl, $C_1$–$C_6$alkoxy, $C_1$–$C_{18}$alkylthio, $C_1$–$C_{18}$alkylamino, cyano, nitro, phenyl, trifluoromethyl, $C_1$–$C_6$cycloalkyl, —C≡N—($C_1$–$C_{24}$alkyl),

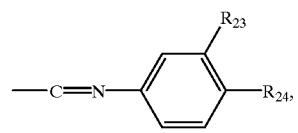

imidazolyl, pyrazolyi, triazolyi, piperazinyl, pyrrolyl, oxazolyl, benzoxazolyl, benzothiazolyl, benzimidazolyl, morpholinyl, piperidinyl or pyrrolidinyl, $T_2$ is —$CH_2$—, —$CH(CH_3)$—, —$C(CH_3)_2$—, —CH=N—, —N=N—, —O—, —S—, —SO—, —$SO_2$— or —$NR_{27}$—, $R_{23}$ and $R_{24}$ are each independently of the other hydrogen, halogen, $C_1$–$C_6$alkyl, $C_1$–$C_6$alkoxy or —CN, $R_{25}$ and $R_{26}$ are each independently of the other hydrogen, halogen or $C_1$–$C_6$alkyl and $R_{27}$ is hydrogen or $C_1$–$C_6$alkyl, j) quinophthalones of formula

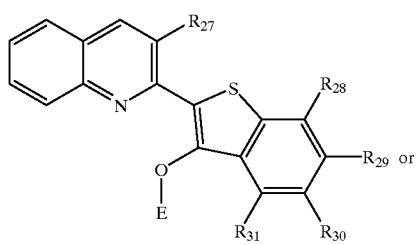
(XIVa)

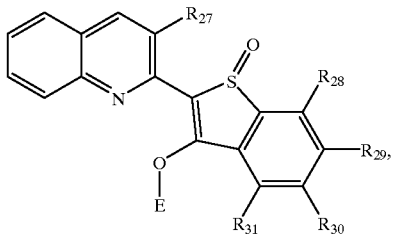
(XIVb)

wherein $R_{27}$ is H or O—E, $R_{28}$ to $R_{31}$ are each independently of the others hydrogen, halogen, —COO—$C_1$–$C_6$alkyl or —CONH—$C_1$–$C_6$alkyl, k) azo compounds of formula

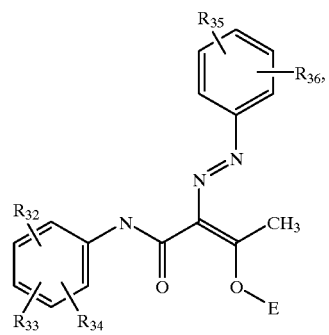
(XVa)

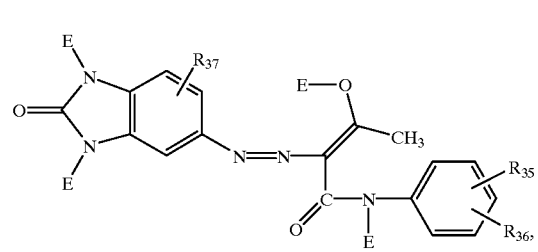
(XVb)

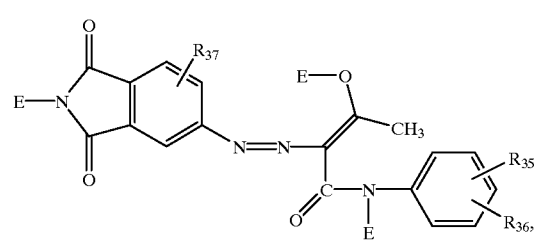
(XVc)

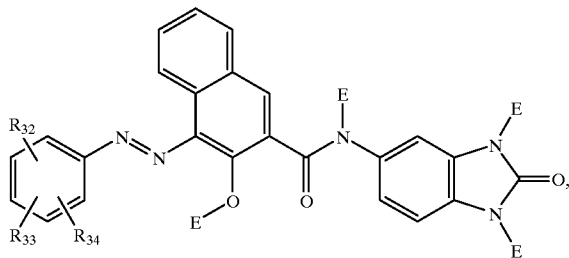

(XVd)

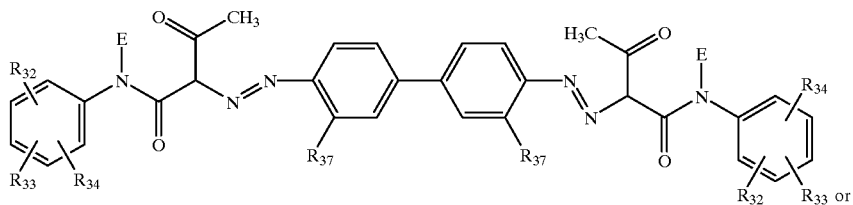

(XVe)

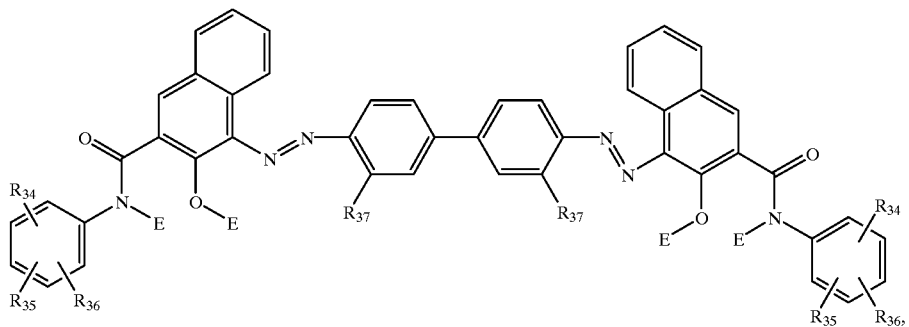

(XVf)

wherein $R_{32}$ to $R_{36}$ are each independently of the others hydrogen, halogen, $C_1$–$C_6$alkyl, $C_1$–$C_6$alkoxy, nitro, acetyl or $SO_2NHC_1$–$C_6$alkyl, and $R_{37}$ is hydrogen, halogen, $C_1$–$C_6$alkyl or $C_1$–$C_6$alkoxy, and I) anthraquinones of formula

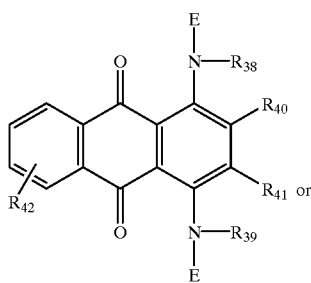

(XVIa)

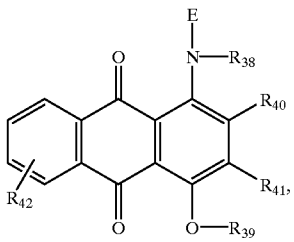

(XVIb)

wherein $R_{38}$ and $R_{39}$ are each independently of the other hydrogen, $C_1$–$C_{12}$alkyl, or $C_6$–$C_{12}$aryl that is unsubstituted or substituted by halogen, $C_1$–$C_6$alkyl, $C_1$–$C_6$alkoxy, nitro, acetyl, $SO_2NHC_1$–$C_6$alkyl or by $SO_2NH_2$, $R_{40}$ and $R_4$, are each independently of the other hydrogen, halogen, $C_1$–$C_6$alkyl, $C_1$–$C_6$alkoxy, nitro, cyano, $CONH_2$, $SO_2NHC_1$–$C_6$alkyl, $SO_2NH_2$, $SO_3H$, $SO_3Na$, or $C_6$–$C_{12}$aryl that is unsubstituted or substituted by halogen, $C_1$–$C_6$alkyl, $C_1$–$C_6$alkoxy, nitro, acetyl, $SO_2NHC_1$–$C_6$alkyl or by $SO_2NH_2$, and $R_{42}$ is hydrogen, halogen, nitro, cyano, hydroxy or $C_1$–$C_6$alkoxy, E in the above-mentioned formulae being in each case hydrogen or B, with the proviso that at least one E in each formula is B, and B has the definitions given above, to which the above-mentioned preferences apply.

Preferred quinacridones are those wherein $R_1$ and $R_2$ in formula III are each independently of the other hydrogen, chlorine or methyl.

Preferred pyrrolo[3,4-c]pyrroles are those wherein G and L in formula XIII are identical and are a group of the formula

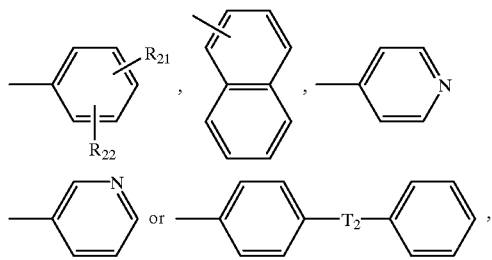

wherein $R_{21}$ and $R_{22}$ are each independently of the other hydrogen, chlorine, bromine, $C_1$–$C_4$alkyl, $C_1$–$C_6$alkoxy, $C_1$–$C_6$alkylamino, CN or phenyl, $T_2$ is —O—, —$NR_{27}$—, —N=N— or —$SO_2$—, and $R_{27}$ is hydrogen, methyl or ethyl.

Preferred azo compounds are those wherein in formulae XVa to XVf $R_{32}$ to $R_{36}$ are each independently of the others hydrogen, halogen, methyl, methoxy, nitro, acetyl or $SO_2NHCH_3$, and $R_{37}$ is halogen or methoxy.

Special preference is given to quinacridones of formula

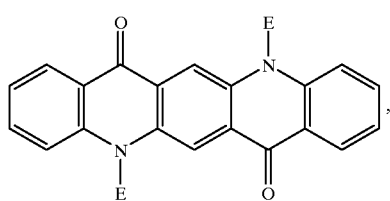

(XVII)

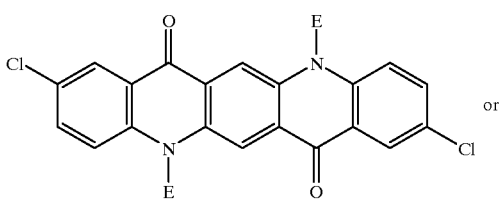

(XVIIIa)

or

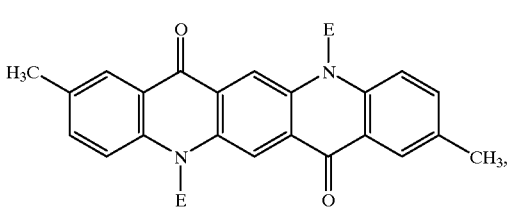

(XVIIIb)

wherein E is hydrogen or B, with the proviso that at least one E in each formula is B, and B is as defined above, dioxazines of formula (IVa) wherein E is hydrogen or B, with the proviso that at least one E in each formula is B, and B is as defined above, pyrrolopyrroies of formula

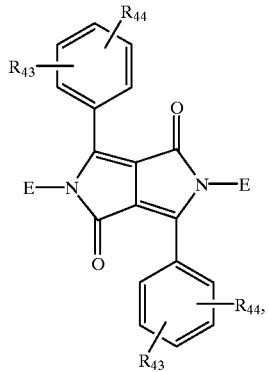

(XIX)

wherein $R_{43}$ and $R_{44}$ are each independently of the other hydrogen, methyl, tert-butyl, chlorine, bromine, CN or phenyl, and E is hydrogen or B, with the proviso that at least one E is B, and B is as defined above, phthalocyanines of formula (XII) wherein M is Cu(II) and $R_{16}$ is hydrogen or E, and z is 1 and y is a number from 1 to 4, with the proviso that at least one E is B, and B is as defined above, isoindolinones of formula

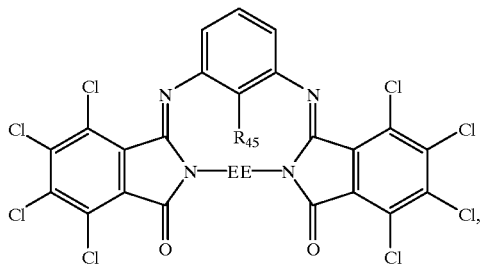

(XX)

wherein $R_{45}$ is hydrogen or $C_1$–$C_4$alkyl, and E is hydrogen or B, with the proviso that at least one E is B, and B is as defined above, indanthrones of formula XXI

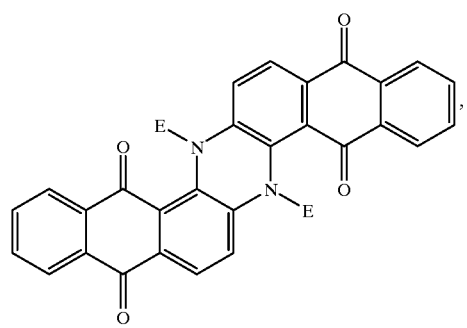

(XXI)

wherein E is hydrogen or B, with the proviso that at least one E is B, and B is as defined above, and azo compounds of formula XVa, XVd, XVe, XVf wherein $R_{32}$ to $R_{36}$ are each independently of the others hydrogen, chlorine, methoxy, nitro, acetyl or $SO_2NHCH_3$, and $R_{37}$ is halogen or methoxy, with the proviso that at least one E is B, and B is as defined above.

Special mention should be made of those soluble chromophores which can be prepared from Colour index Pigment Yellow 13, Pigment Yellow 73, Pigment Yellow 74, Pigment Yellow 83, Pigment Yellow 93, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 37, 3,6-di(4'-cyano-phenyl)-2,5-dihydro-pyrrolo[3,4c]pyrrole-1,4-dione and 3-phenyl-6-(4'-tert-butyl-phenyl)-2,5-dihydro-pyrrolo[3,4-c]pyrrole-1,4-dione.

The compounds of formula I can be prepared analogously to methods known per se, as described, for example, in EP 648 770 and EP 648 817, for example by reacting a compound of the formula $$A(H)_x,$$

wherein A and x are as defined above, in the desired molar ratio with a dicarbonate of the formula

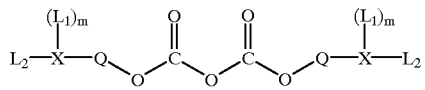

in an aprotic organic solvent in the presence of a base as catalyst, advantageously at temperatures of from 0 to 120° C., preferably from 10 to 100° C., for from 2 to 80 hours.

The molar ratio in each particular case is governed by x, that is to say the number of radicals B to be introduced. The dicarbonate is advantageously used in slight excess.

Suitable aprotic organic solvents are, for example, ethers, such as tetrahydrofuran or dioxane, or glycol ethers, such as ethylene glycol methyl ether, ethylene glycol ethyl ether, diethylene glycol monomethyl ether or diethylene glycol monoethyl ether, and also dipolar aprotic solvents, such as acetonitrile, benzonitrile, N,N-dimethylformamide, N,N-dimethyl-acetamide, nitrobenzene, N-methylpyrrolidone, halogenated aliphatic or aromatic hydrocarbons, such as trichloroethane, benzene, or benzene substituted by alkyl, alkoxy or by halogen, such as toluene, xylene, anisole or chlorobenzene, or aromatic N-heterocycles, such as pyridine, picoline or quinoline. Preferred solvents are, for example, tetrahydrofuran, N,N-dimethylformamide and N-methylpyrrolidone. The mentioned solvents can also be used in the form of mixtures. It is advantageous to use from 5 to 20 parts by weight of solvent to 1 part by weight of reactant.

Bases suitable as catalyst are, for example, the alkali metals themselves, such as lithium, sodium or potassium and the hydroxides and carbonates thereof, or alkali metal amides, such as lithium, sodium or potassium amide, or alkali metal hydrides, such as lithium, sodium or potassium hydride, or alkaline earth or alkali metal alcoholates that are derived especially from primary, secondary or tertiary aliphatic alcohols having from 1 to 10 carbon atoms, such as, for example, lithium, sodium or potassium methanolate, ethanolate, n-propanolate, isopropanolate, n-butanolate, sec-butanolate, tert-butanolate, 2-methyl-2-butanolate, 2-methyl-2-pentanolate, 3-methyl-3-pentanolate, 3-ethyl-3-pentanolate, and also organic aliphatic, aromatic or heterocyclic N-bases including, for example, diazabicyclooctene, diazabicycloundecene and 4-dimethylaminopyridine, and trialkylamines, for example trimethylamine or triethylamine. It is also possible, however, to use a mixture of the mentioned bases.

Preference is given to the organic N-bases, such as, for example, diazabicyclooctane, diazabicycloundecene and especially 4-dimethylaminopyridine.

The reaction is carried out especially at temperatures of from 18 to 40° C., that is to say preferably at room temperature, and under atmospheric pressure.

The dicarbonates of the formula

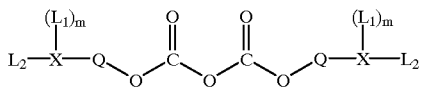

suitable for the preparation of the compounds of formula I according to the invention can be prepared analogously to generally known methods. Most of the chemicals required for that purpose are known. Many of them are commercially available and all of them can be prepared in accordance with methods known per se.

The compounds of formula I according to the invention are excellently suitable as fluorescent dyes for the mass-colouring of high-molecular-weight organic material.

Examples of suitable high-molecular-weight organic materials that can be coloured using the compounds of formula I according to the invention are vinyl polymers, e.g. polystyrene, poly-α-methylstyrene, poly-p-methylstyrene, poly-p-hydroxystyrene, poly-p-hydroxyphenylstyrene, poly (methylacrylate) and poly(acrylamide) and also the corresponding methacrylic compounds, poly(methyl maleate), poly(acrylonitrile), poly(methacrylonitrile), poly(vinyl chloride), poly(vinyl fluoride), poly(vinylidene chloride), poly(vinylidene fluoride), poly(vinyl acetate), poly (methylvinyl ether) and poly(butylvinyl ether); novolaks derived from $C_1$–$C_6$-aldehydes, e.g. formaldehyde and acetaldehyde, and a dinuclear, preferably mononuclear, phenol that is unsubstituted or substituted by one or two $C_1$–$C_9$alkyl groups, by one or two halogen atoms or by a phenyl ring, such as, for example, o-, m- or p-cresol, xylene, p-tert-butylphenol, o-, m- or p-nonylphenol, p-chlorophenol or p-phenylphenol, or a compound having more than one phenolic group, e.g. resorcinol, bis(4-hydroxyphenyl) methane or 2,2-bis(4-hydroxyphenyl)propane; polymers derived from maleimide and/or maleic anhydride, e.g. copolymers of maleic anhydride and styrene; poly (vinylpyrrolidone), biopolymers and derivatives thereof, e.g. cellulose, starch, chitin, chitosan, gelatin, zein, ethylcellulose, nitrocellulose, cellulose acetate and cellulose butyrate; natural resins and synthetic resins, e.g. rubber, casein, silicone and silicone resins, ABS, urea- and melamine-formaldehyde resins, alkyd resins, phenol resins, polyamides, polyimides, polyamide/imides, polysulfones, polyether sulfones, polyphenylene oxides, polyurethanes, polyureas, polycarbonates, polyarylenes, polyarylene sulfides, polyepoxides, polyolefins and polyalkadienes. Preferred high-molecular-weight organic materials are, for example, cellulose ethers and esters, such as ethylcellulose, nitrocellulose, cellulose acetate or cellulose butyrate, natural resins or synthetic resins, such as polymerisation or condensation resins, such as aminoplasts, especially urea- and melamine-formaldehyde resins, alkyd resins, phenoplasts, polycarbonates, polyolefins, polystyrene, polyvinyl chloride, polyamides, polyurethanes, polyesters, ABS, polyphenylene oxides, rubber, casein, silicone and silicone resins, individually or in admixture.

The mentioned high-molecular-weight organic compounds may be present individually or in mixtures in the form of plastics, melts or in the form of spinning solutions, paints, coating compositions or printing inks. According to the intended use it has proved advantageous to use the compounds of formula I according to the invention as toners or in the form of a preparation.

The compounds of formula I according to the invention are especially suitable for the mass-colouring of polyvinyl chloride and especially polyolefins, such as polyethylene and polypropylene, as well as of paints and also of powder coating compositions, printing inks and coating compositions.

The compounds of formula I according to the invention can be used in an amount of from 0.01 to 30% by weight, preferably from 0.1 to 10% by weight, based on the high-molecular-weight organic material to be coloured.

The colouring of high-molecular-weight organic substances with the compounds of formula I according to the invention is carried out, for example, by mixing the compound of formula I, optionally in the form of a master batch, into those substrates using roll mills or mixing or grinding apparatus. The coloured material is then brought into the desired final form according to procedures known per se, such as calendering, compression moulding, extrusion moulding, coating, casting or injection-moulding. It is often desirable for the purpose of producing non-rigid mouldings or reducing the brittleness thereof to incorporate so-called plasticisers into the high-molecular-weight compounds before shaping. There may be used as plasticisers, for example, esters of phosphoric acid, phthalic acid or sebacic acid. The plasticisers can be incorporated into the polymers before or after the incorporation of the compounds of formula I according to the invention. In order to obtain different colour shades it is also possible to add to the high-molecular-weight organic substances, in addition to the compound according to the invention, any desired amounts of fillers or other colour-imparting constituents, such as white, coloured or black pigments.

For the colouring of paints, coating compositions and printing inks, the high-molecular-weight organic materials and the compounds of formula I according to the invention, optionally together with additives, such as fillers, pigments, siccatives or plasticisers, are finely dispersed or dissolved in a common organic solvent or solvent mixture. It is also possible for the individual components to be dispersed or dissolved separately, or for several components to be dispersed or dissolved together, and only then for all the components to be combined.

In colourings, for example of polyvinyl chloride or polyolefins or in printing inks, the compounds of formula I according to the invention are distinguished by good general properties, such as good migration-stability and light- and weather-fastness, but especially by their unexpectedly high fluorescence.

Very great importance is attached, however, to the conversion of the soluble chromophores according to the invention that have been incorporated into a substrate into the corresponding pigments of the formula $A(H)_x$. This can be achieved most simply by thermal treatment (heating to temperatures of from 50 to 250° C., preferably from 100 to 200° C., according to the pigment) of the solids, solutions or dispersions comprising the soluble compounds according to the invention in organic or aqueous media, polymer solutions or melts. This allows the colouring of paints, printing inks, plastics, especially also in fibre form, heat-sensitive registration systems, inks for ink-jet printing, colour tapes for thermal transfer printing onto smooth or woven receiver substrates, and very specifically also in light-sensitive compositions, for example negative or positive resist formulations, giving an overall improvement in properties, such as purity, colour strength, brilliance and transparency, and also allows interesting applications in analysis.

The invention therefore relates also to high-molecular-weight organic material comprising in its mass a pigment of the formula $A(H)_x$ produced in situ by thermal degradation of a soluble compound of formula I, to a thermo-, photo- or chemo-sensitive recording material, and to an ink for ink-jet printing, a colour tape for thermal transfer printing or a light-sensitive negative or positive resist composition, each comprising a soluble compound of formula I.

Inks for ink-jet printing, colour tapes for thermal transfer printing, thermo-, photo- and chemo-sensitive recording materials and also light-sensitive negative or positive resist compositions are well known to the person skilled in the art.

It has also been found that in the case of certain compounds of formula I the thermal treatment comprising heating to temperatures of from 100 to 200° C., preferably from 105 to 120° C., may result in crystal modification conversions of the corresponding chromophores of the formula $A(H)_x$. If different compounds of formula I are used, it is also possible to prepare mixed crystals.

The invention therefore relates also to a process for the preparation of mixed crystals or for the crystal modification conversion of chromophores of formula $A(H)_x$ by conversion into compounds of formula I, for example in accordance with the above-mentioned process, and thermal treatment of the resulting compounds of formula I at temperatures of from 100 to 200° C.

A very special, surprising advantage of the compounds according to the invention is their extraordinarily high solubility. As a result it is possible to incorporate relatively high concentrations into a substrate, so that a higher colour intensity can be achieved. A further surprising advantage is that the conversion into the pigment is more complete than in the case of known soluble pigments, thereby improving the migration tendency after conversion into the pigment. Another surprising advantage is that soluble chromophores can be prepared from pigments that could not be reacted, or could be reacted only unsatisfactorily, with the solubilising groups known hitherto.

As a result of those improved properties, the soluble chromophores of formula I according to the invention can be used especially advantageously in compositions that are used in the preparation of structured colour formers or colour filters. The use of soluble pigment precursors in the preparation of structured colour formers or colour filters is known from EP 654 711. Those compositions comprise, for example, a soluble chromophore of formula I and a positive or negative resist resin. In particular, it is possible for resist formulations comprising soluble pigment precursors to be irradiated and developed in the desired pattern, it being possible for the soluble pigment precursor to be converted into the insoluble pigment during irradiation or development or alternatively only subsequently. The soluble pigment precursor can also be applied in the desired pattern directly to a receiving layer suitable for the purpose by means of ink-jet printing or by thermally induced diffusion. The methods disclosed in EP 654 711 are very suitable for the production of colour filters.

The following Examples illustrate the invention (unless otherwise indicated, "%" are always % by weight):

EXAMPLE 1

A solution of 52.52 g of methyl iodide in 100 ml of dry diethyl ether is added dropwise to a suspension of 9.0 g of magnesium turnings in 50 ml of dry diethyl ether. After 1½ hours under reflux, a solution of 30 g of (2-methoxy-ethoxy)-acetic acid ethyl ester in 150 ml of diethyl ether is added dropwise, the temperature of the reaction mixture being maintained at 25° C. by external cooling with ice-water. After one hour at 25° C., the reaction mixture is cooled to 10° C.; 75 ml of diethyl ether are added and then 135 ml of 10% hydrochloric acid are added dropwise at 10–15° C. The organic phase is wascched with 100 ml of saturated NaHCO$_3$ solution and 100 ml of H$_2$O, dried with MgSO$_4$, filtered through a small amount of kieselguhr and concentrated by evaporation, yielding 22.69 (82% of theory) of product of the formula

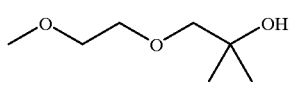

B.p.: 90° C./0.8 mbar. $^1$H-NMR (CDCl$_3$, 300 MHz) δ: 3.33–3.38 (m, 2H, —O—CH$_2$—), 3.23–3.28 (m, 2H, —O—CH$_2$—), 3.07 (s, 3H, O—CH$_3$), 3.00 (s, 2H, —O—CH$_2$—), 2.68 (broad, —OH), 0.88 (s, 6H, —CH$_3$).

The same product can also be prepared analogously to the method given in U.S. Pat. No. 2 886 600.

EXAMPLE 2

20 g of 60% sodium hydride are added in portions to a solution, cooled to 0° C., of 74.1 g of the product of Example 1 in 400 ml of toluene under a protective gas atmosphere in such a manner that the temperature does not exceed 30° C. After cooling the reaction mixture to 5° C., 26.4 g of CO$_2$ dried with CaCl$_2$ are introduced at 5–10° C. The reaction mixture is heated to 18° C. and there are then added in succession 1.52 g of benzyltriethylammonium chloride, 1.32 g of pyridine and 40.0 g of toluene-4-sulfonyl chloride. The suspension that forms is stirred overnight at room temperature. Then, at 5° C., 180 ml of 5% aqueous H$_2$SO$_4$ are added dropwise in such a manner that the temperature does not exceed 10° C. The organic phase is separated off, washed three times using 400 ml of water each time, dried over MgSO$_4$ and concentrated in vacuo, yielding 68.2 g (89% of theory) of a slightly brownish liquid of the formula

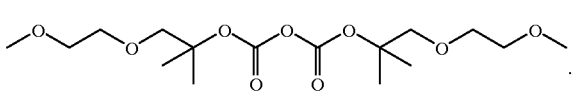

Analysis: calc.: C, 52.45%, H, 8.25%; found: C, 52.38%, H, 8.49%. $^1$H-NMR (CDCl$_3$, 300 MHz) δ: 3.59–3.74 (m, 12H, —O—CH$_2$—), 3.45 (s, 6H, —O—CH$_3$), 1.60 (s, 12H, —CH$_3$).

EXAMPLE 3

13.2 g of dimethylaminopyridine and 198 g of the product from Example 2 are added to a suspension of 65.4 g of Pigment Violet 37 in 2000 ml of tetrahydrofuran. The reaction mixture is stirred overnight at room temperature, then filtered through a small amount of kieselguhr, and the filtrate is evaporated. The residue is suspended in about 1000 ml of n-hexane and filtered, yielding 82.9 g (65% of theory) of a red compound having the formula

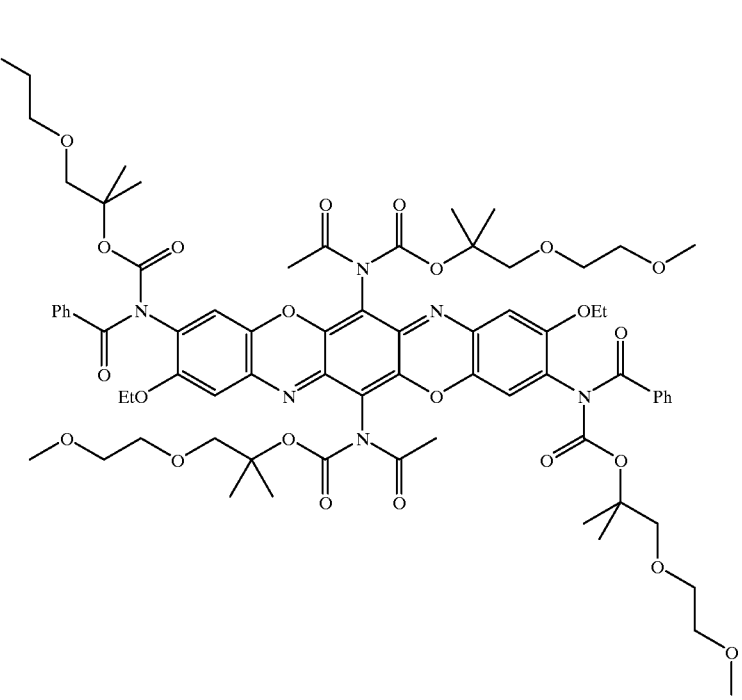

Analysis: calc.: C, 60.75%, H, 6.37%, N, 5.90%; found: C, 60.81%, H, 6.33%, N, 5.95%. $^1$H-NMR (CDCl$_3$), δ: 7.76 (d, 4H, phenyl), 7.48 (t, 2H, phenyl), 7.41 (t, 4H, phenyl), 7.11 (s, 2H), 7.00 (s, 2H), 4.03 (q, O—CH$_2$—), 3.04–3.60 (m), 2.66 (m), 1.18–1.70 (m).

EXAMPLE 4

0.35 g of dimethylaminopyridine and 5.2 g of the product from Example 2 are added to a suspension of 2.0 g of Pigment Red 122 in 60 ml of tetrahydrofuran. The reaction mixture is stirred overnight at room temperature, then filtered through a small amount of kieselguhr, and the filtrate is evaporated. After the addition of 40 ml of dichloromethane, the organic phase is dried over $MgSO_4$, filtered and concentrated by evaporation. The residue is purified by column chromatography on silica gel, yielding 1.48 g (60% of theory) of the pure compound having the formula

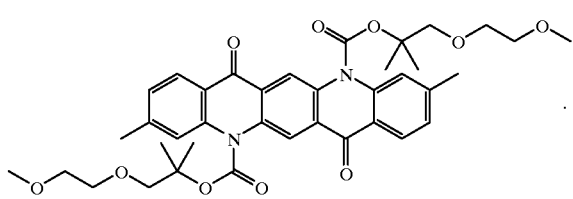

Analysis: calc.: C, 66.27%, H, 6.44%, N, 4.07%; found: C, 65.82%, H, 6.42%, N, 4.03%. $^1$H-NMR (CDCl$_3$) δ: 8.85 (s, 2H, aromatic compound), 8.12 (s, 2H, aromatic compound), 7.91 (s, 2H, aromatic compound), 7.49 (s, 2H, aromatic compound), 3.84 (s, 4H, O—CH$_2$—), 3.84 (s, 4H, O—CH$_2$—), 3.68 (m, 4H, O—CH$_2$—), 3.53 (m, 4H, O—CH$_2$—), 3.28 (s, 6H, O—CH$_3$), 2.44 (s, 6H, CH$_3$), 1.65 (s, 12H, CH$_3$).

EXAMPLE 5

A procedure analogous to Example 4 is carried out, but Pigment Violet 29 is used instead of Pigment Red 122. The compound of the following formula is obtained:

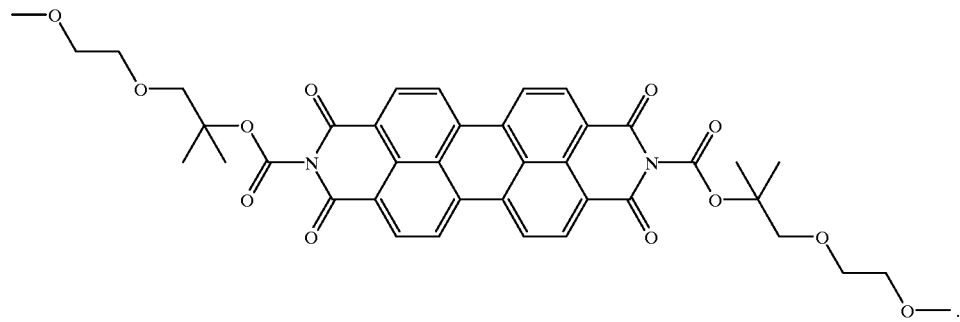

Analysis: calc.: C, 65.03%, H, 5.19%, N, 3.79%; found: C, 65.14%, H, 4.93%, N, 3.69%.

EXAMPLE 6

0.085 g of dimethylaminopyridine and 10 g of the product from Example 2 are added to a suspension of 2.0 g of 3,6-di(4-biphenylyl)-2,5-dihydro-pyrrolo[3,4-c]pyrrole-1,4-dione in 50 ml of tetrahydrofuran. The reaction mixture is stirred overnight at room temperature and then the solvent is distilled off from the fluorescent orange-brown solution, yielding 2.26 g (63% of theory) of the compound having the formula

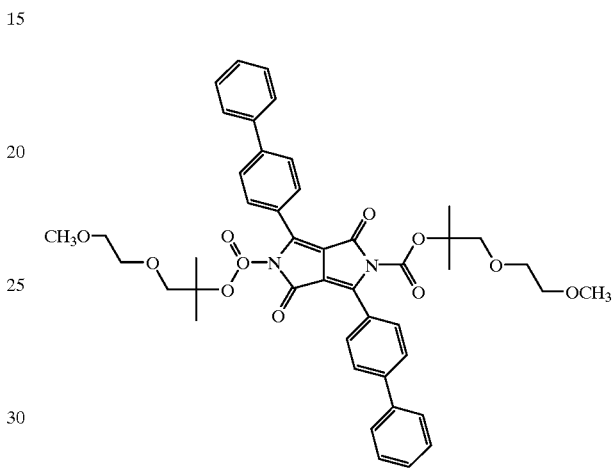

Analysis: calc.: C, 70.04%, H, 6.13%, N, 3.55%; found: C, 69.88%, H, 6.21%, N, 3.69%.

EXAMPLE 7

The product from Example 1 is reacted with phosgene analogously to one of the known processes to form the product of the formula

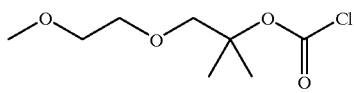

which is then reacted with Pigment Yellow 109 analogously to Example 3, yielding the compound of formula

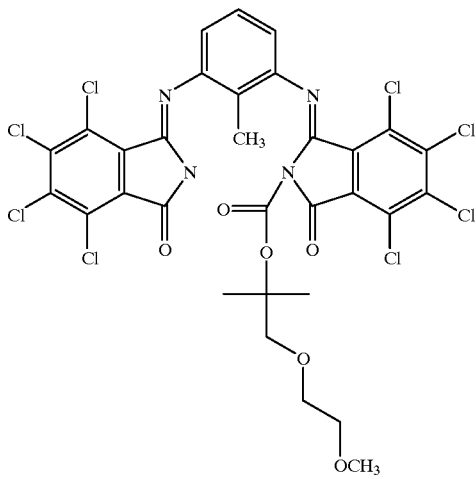

Analysis: calc.: C, 44.85%, H, 2.67%, N, 6.75%, Cl, 34.16%; found: C, 44.98%, H, 2.87%, N, 6.52%, Cl, 32.39%. $^1$H-NMR (CDCl$_3$): 8.26 (s, 1H, NH), 7.16 (t, 1H, phenyl), 6.68 (d, 1H, phenyl), 76.49 (d, 1H, phenyl), 3.62 (m, 2H, O—CH$_2$), 3.51 (m, 2H, O—CH$_2$—), 3.45 (s, 2H, O—CHO, 3.34 (s, 3H, O—CH$_3$), 2.07 (s, 3H, —CH$_3$), 1.27 (s, 6H, —CH$_3$).

EXAMPLE 8

A procedure analogous to Example 1 is carried out, but (2-methoxy-ethoxy)-acetic acid ethyl ester is replaced by an equivalent amount of methoxy-acetic acid ethyl ester. The product of the following formula is obtained:

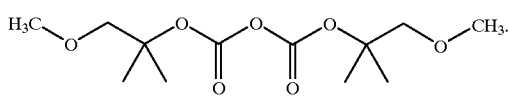

EXAMPLE 9

A procedure analogous to Example 2 is carried out, but the product according to Example 1 is replaced by an equivalent amount of the product according to Example 8. The product of the following formula is obtained:

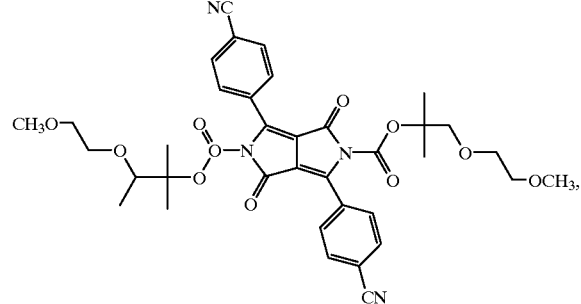

EXAMPLE 10

A procedure analogous to Example 6 is carried out, but the product according to Example 2 is replaced by an equivalent amount of the product according to Example 9. The product of the following formula is obtained:

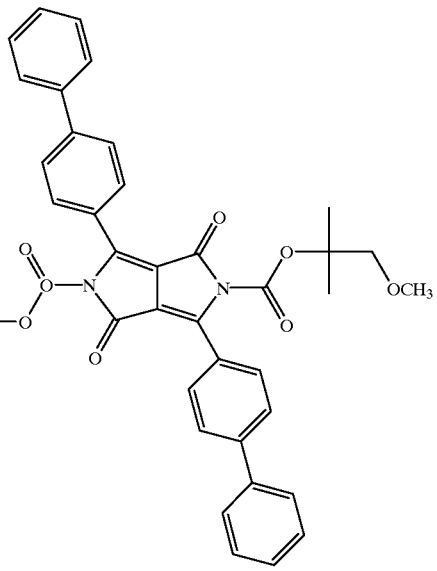

Analysis: calc.: C, 65.68%, H, 5.88%, N, 5.11%; found: C, 65.68%, H, 5.84%, N, 5.05%.

EXAMPLES 11–14

Analogously to Examples 3–6 or 10 there are obtained the products of formulae

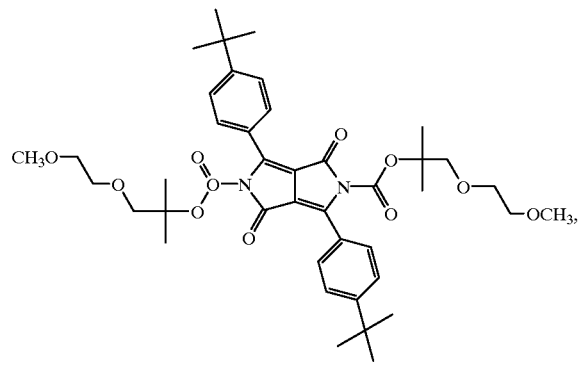

Analysis: calc.: C, 62.97%, H, 5.58%, N, 8.16%; found: C, 63.33%, H, 5.44%, N, 8.75%.

Analysis: calc.: C, 67.36%, H, 7.54%, N, 3.74%; found: C, 66.36%, H, 7.60%, N, 3.55%.

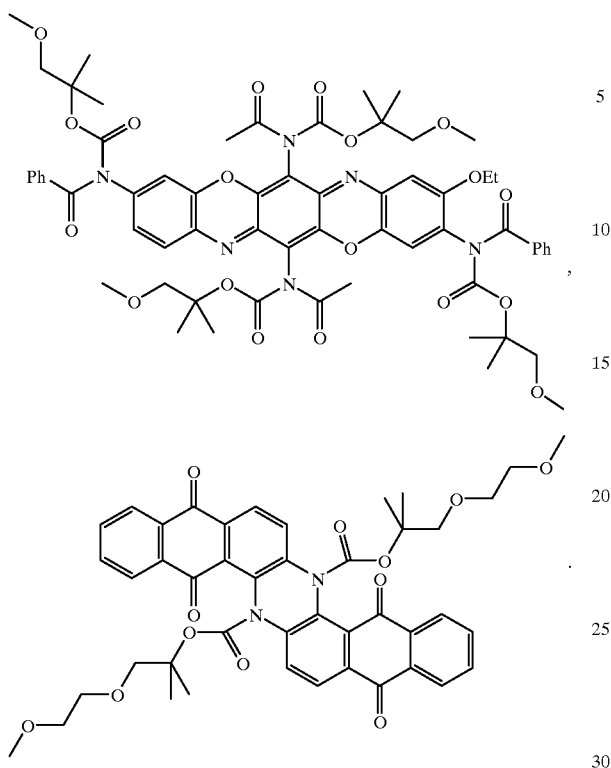

Analysis: calc.: C, 70.12%, H, 4.58%, N, 4.54%; found: C, 70.12%, H, 4.65%, N, 4.81%.

EXAMPLE 15

A procedure analogous to that of Examples 3–6 or 10 is carried out, but using the pigment prepared in accordance with Example 1a) of EP 311 562. The product of the following formula is obtained:

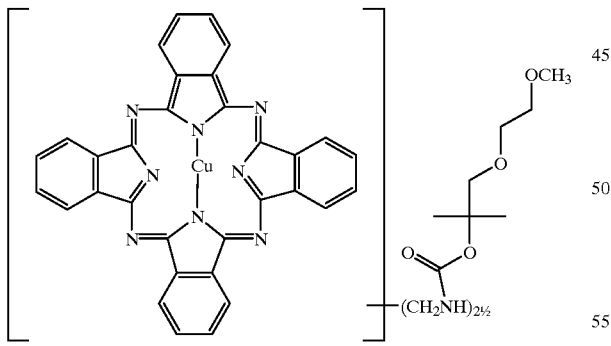

Analysis: calc.: C, 60.38%, H, 5.44%, N,13.57%; found: C, 59.27%, H, 5.67%, N,13.25%.

EXAMPLE 16

A procedure analogous to Example 7 is carried out, but 3,6-di(4-tert-butyl-phenyl)-2,5-dihydro-pyrrolo[3,4-c]pyrrole-1,4-dione is used instead of Pigment Yellow 109. The product of the following formula is obtained:

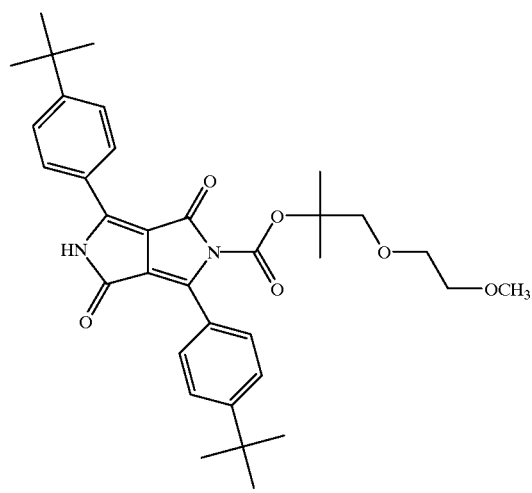

It is also possible to proceed analogously to Examples 3–6 or 10, but using a smaller amount of the dicarbonate according to Example 9. The same product is obtained in admixture with the product according to Example 12.

EXAMPLE 17

A procedure analogous to Example 16 is carried out, but the product according to Example 2 is replaced by an equivalent amount of the product according to Example 9. The product of the following formula is obtained:

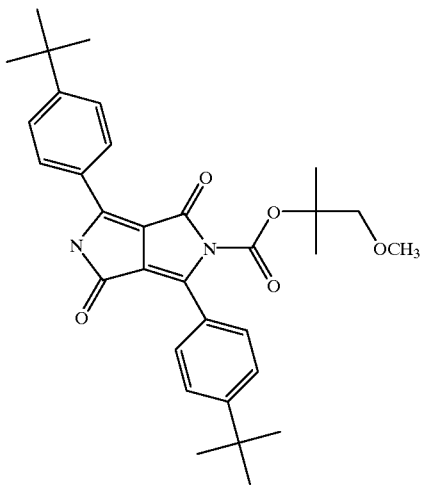

EXAMPLE 18

A procedure analogous to Example 16 is carried out, but Pigment Violet 29 is used instead of 3,6-di(4-tert-butyl-phenyl)-2,5-dihydro-pyrrolo[3,4-c]pyrrole-1,4-dione. The product of the following formula is obtained:

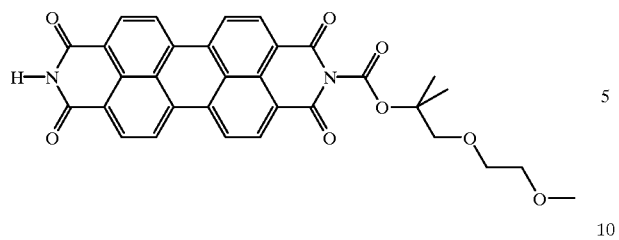

EXAMPLE 19

A procedure analogous to Example 16 is carried out, but indanthrone (Pigment Blue 60) is used instead of 3,6-di(4-tert-butyl-phenyl)-2,5-dihydro-pyrrolo[3,4-c]pyrrole-1,4-dione. The product of the following formula is obtained:

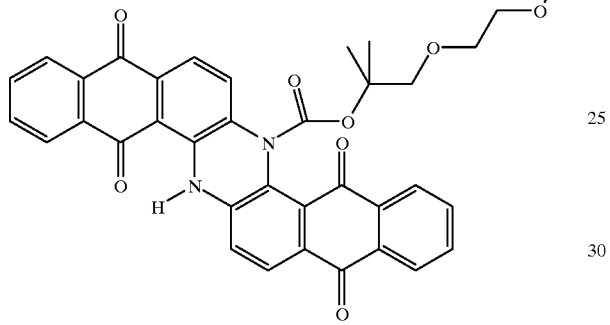

Analysis: calc.: C, 66.83%, H, 5.35%, N, 3.54%; found: C, 66.61%, H, 5.61%, N, 3.74%.

EXAMPLE 20

Analogously to Example 7 there is obtained the product of the formula

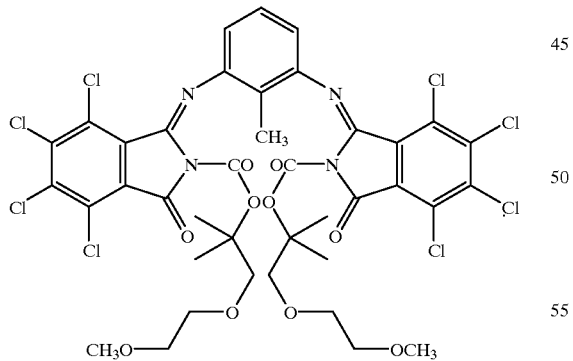

Analysis: calc.: C, 46.64%, H, 3.61%, N, 5.58%, Cl, 28.24%; found: C, 46.67%, H, 3.43%, N, 5.60%, Cl, 27.65%.

EXAMPLE 21

Analogously to Examples 7 and 20 there is obtained the product of the formula

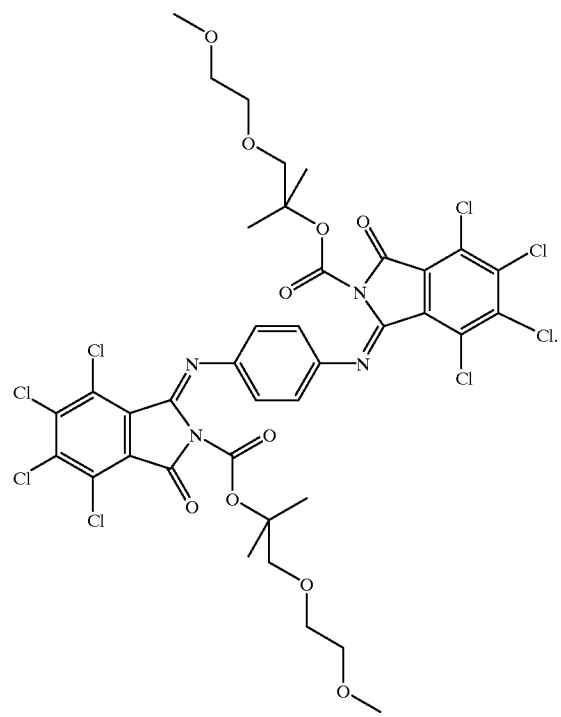

Analysis: calc.: C, 46.09%, H, 3.46%, N, 5.66%, Cl, 29.64%; found: C, 46.31%, H, 2.97%, N, 5.97%, Cl, 28.47%.

EXAMPLE 22

Analogously to Example 10 there is obtained the product of the formula

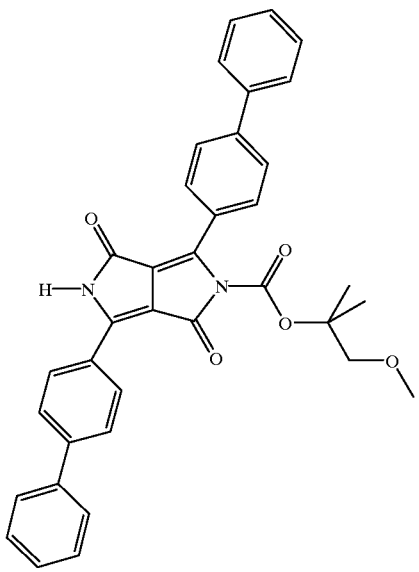

Analysis: calc.: C, 68.89%, H, 5.30%, N, 6.69%; found: C, 67.94%/, H, 5.52%, N, 6.41%.

EXAMPLE 23

Analogously to Example 22 there is obtained the product of the formula

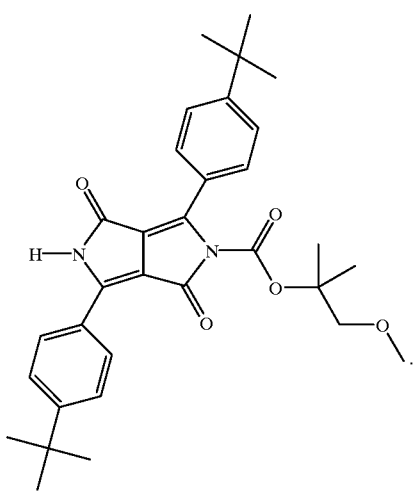

Analysis: calc.: C, 69.07%, H, 7.32%, N, 4.24%; found: C, 69.56%, H, 7.48%, N, 4.16%.

EXAMPLE 24

Analogously to Examples 22 and 23 there is obtained the product of the formula

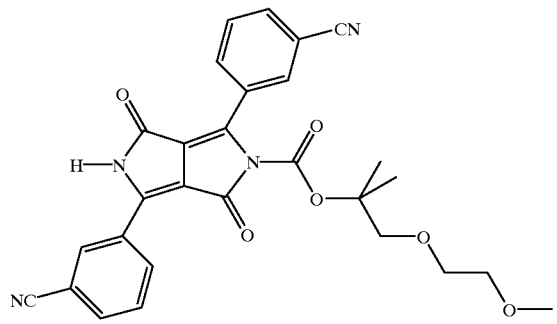

Analysis: calc.: C, 65.62%, H, 4.72%, N10.93%; found: C, 65.04%, H, 5.20%, N10.02%.

EXAMPLE 25

Analogously to Examples 22, 23 and 24 there is obtained the product of the formula

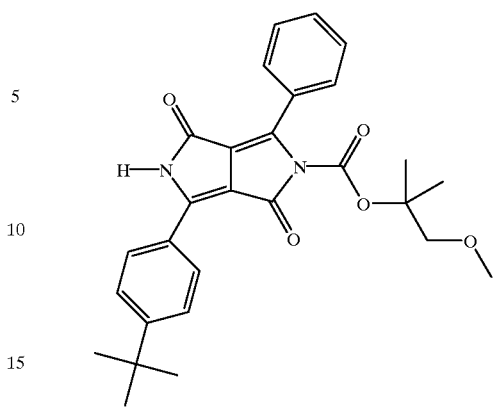

Analysis: calc.: C, 70.87%, H, 6.37%, N, 5.90%; found: C, 70.18%, H, 7.03%, N, 5.66%.

EXAMPLE 26

Analogously to Examples 10 and 25 there is obtained the product of the formula

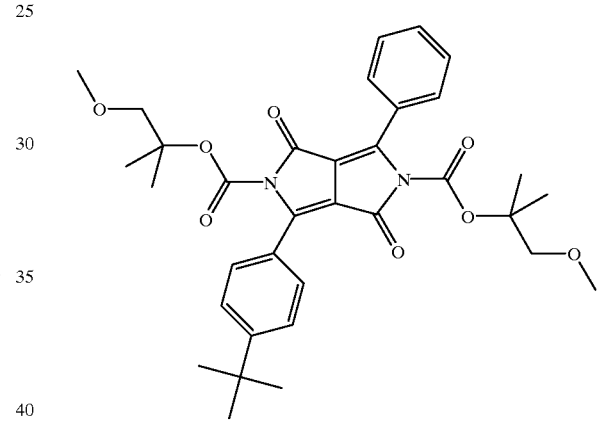

Analysis: calc.: C, 67.53%, H, 6.67%, N, 4.63%; found: C, 66.95%, H, 6.80%, N, 4.48%.

EXAMPLE 27

Analogously to Example 6 there is obtained the product of the formula

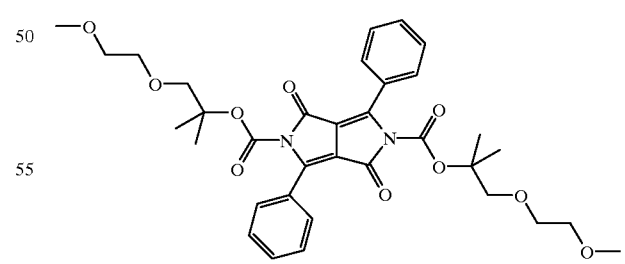

Analysis: calc.: C, 64.14%, H, 6.33%, N, 4.40%; found: C, 63.98%, H, 6.24%, N, 4.69%.

EXAMPLE 28

Analogously to Examples 6 and 27 there is obtained the product of the formula

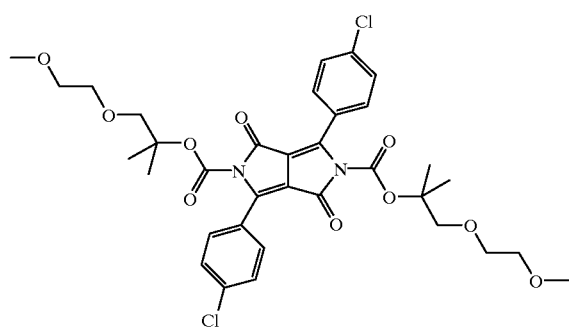
Analysis: calc.: C, 57.88%, H, 5.42%, N, 3.97%, Cl, 10.05%; found: C, 57.29%, H, 4.92%, N, 4.68%, Cl, 11.44%.
EXAMPLE 29
Analogously to the preceding Examples there is obtained the product of the formula
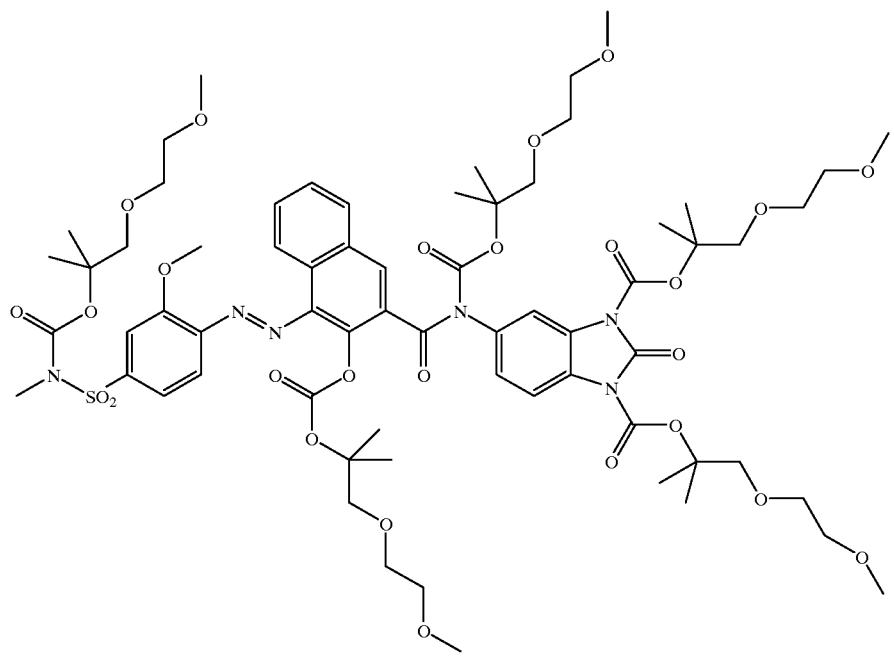
Analysis: calc.: C, 56.21%, H, 6.62%, N, 5.87%, S 2.24%; found: C, 56.41%, H, 6.95%, N, 5.57%, S 2.03%.
EXAMPLE 30
Analogously to the preceding Examples there is obtained the product of the formula

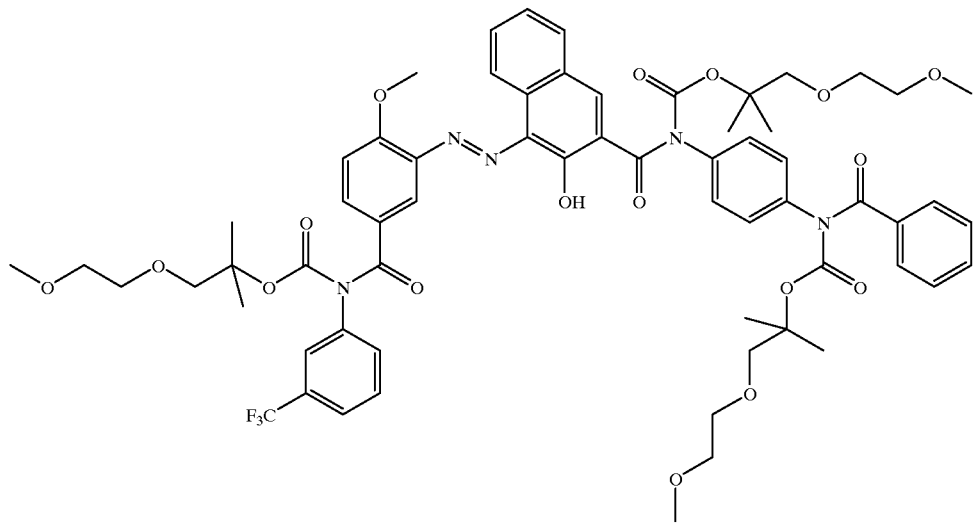
Analysis: calc.: C, 62.80%, H, 5.36%, N, 6.66%; found: C, 63.05%, H, 5.33%, N, 6.80%.
EXAMPLE 31
Analogously to the preceding Examples there is obtained the product of the formula
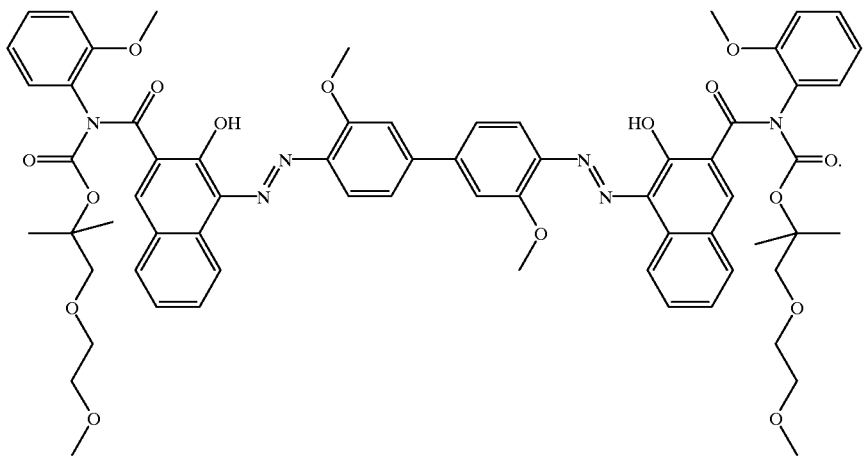
Analysis: calc.: C, 65.99%, H, 5.70%, N, 7.00%; found: C, 66.90%, H, 5.93%, N, 7.15%.
EXAMPLE 32
Analogously to the preceding Examples there is obtained the product of the formula

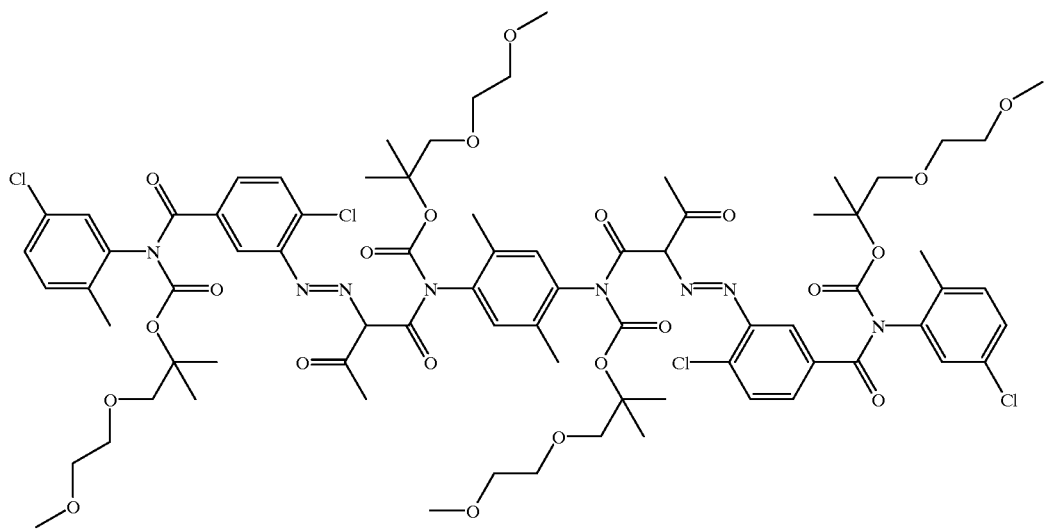
Analysis: calc.: C, 56.58%, H, 5.87%, N, 6.95%, Cl, 8.79%; found: C, 55.94%, H, 6.19%, N, 6.61%, Cl, 7.17%.
EXAMPLE 33
Analogously to the preceding Examples there is obtained the product of the formula
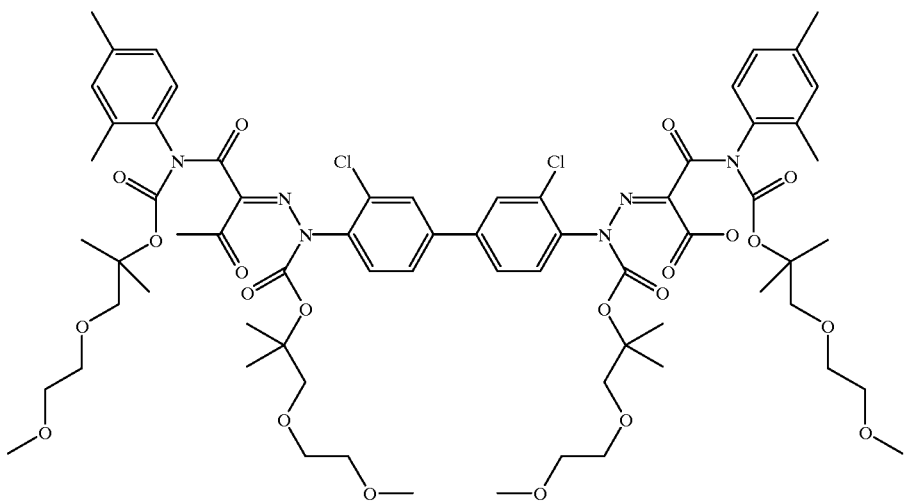
Analysis: calc.: C, 59.13%, H, 6.52%, N, 6.09%, Cl, 5.07%; found: C, 59.78%, H, 6.67%, N, 6.39%, Cl, 5.13%.
EXAMPLE 34
Analogously to the preceding Examples there is obtained the product of the formula

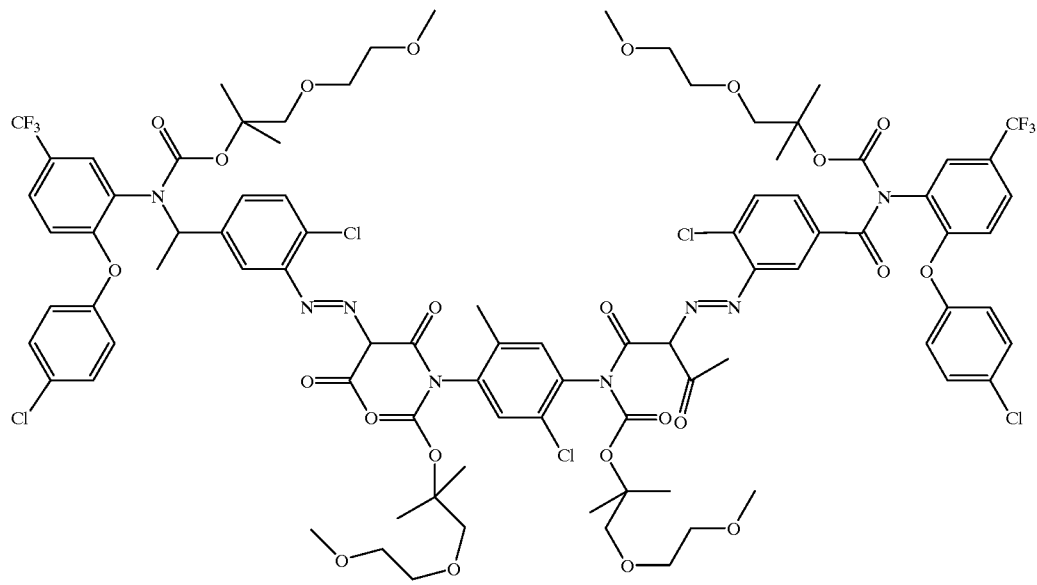
Analysis: calc.: C, 54.20%, H, 4.83%, N, 5.81%, Cl, 9.22%; found: C, 54.55%, H, 5.00%, N, 5.61%, Cl, 8.51%.
EXAMPLE 35
Analogously to the preceding Examples there is obtained the product of the formula
Analysis: calc.: C, 55.13%, H, 6.01%, N, 5.66%, Cl, 8.96%; found: C, 55.18%, H, 5.93%, N, 6.14%, Cl, 9.16%.
EXAMPLE 36
Analogously to the preceding Examples there is obtained the product of the formula
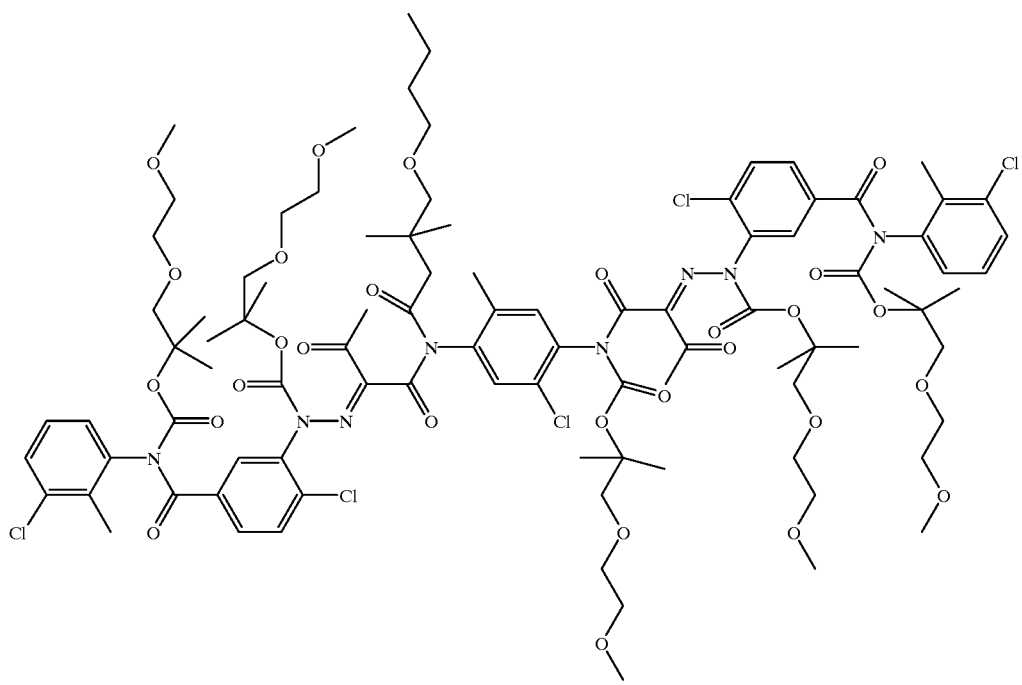

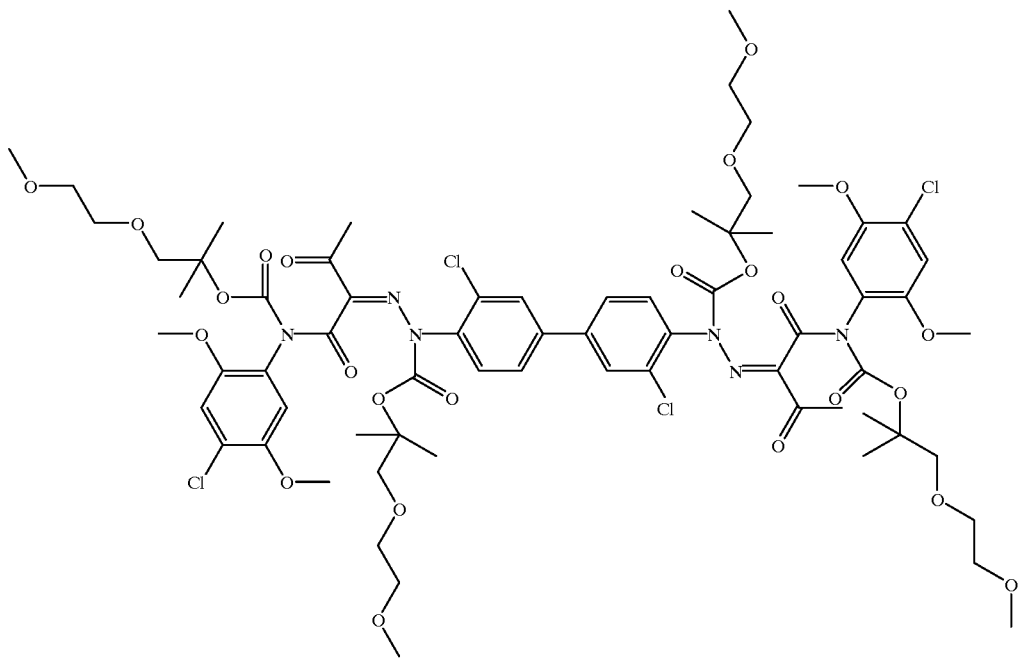

Analysis: calc.: C, 53.90%, H, 5.81%, N, 5.55%, Cl, 9.38%; found: C, 55.21%, H, 5.91%, N, 5.43%, Cl, 7.53%.

EXAMPLE 37

Analogously to the preceding Examples there is obtained the product of the formula

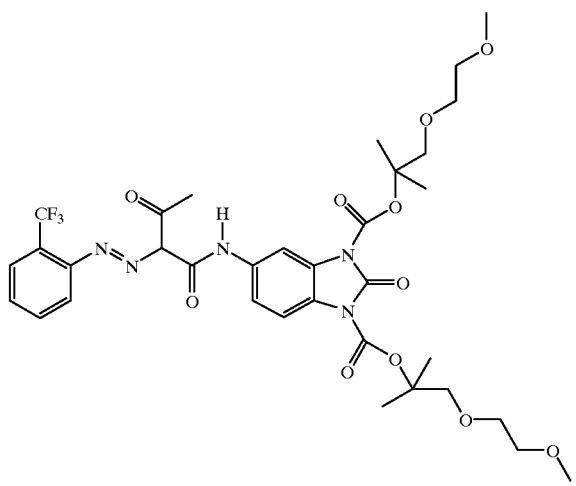

Analysis: calc.: C, 54.18%, H, 5.62%, N, 9.29%; found: C, 54.12%, H, 5.54%, N, 9.61%.

EXAMPLE 38

Analogously to the preceding Examples there is obtained the product of the formula

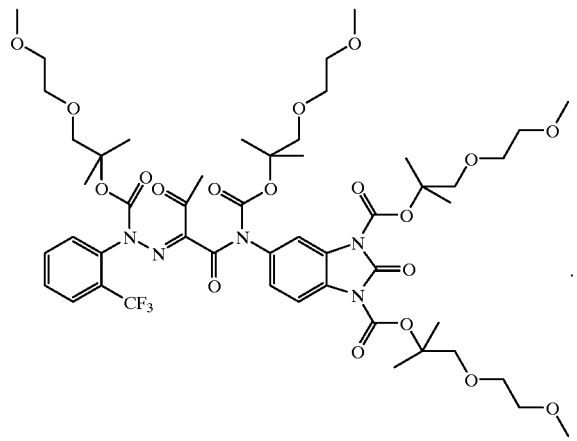

EXAMPLES 39–66

(Thermographic analysis) On heating the products indicated at a heating rate of 10° C./min, the corresponding pigments are re-formed.

The following Table shows the decomposition temperature (the so-called "mid-point temperature", that is to say the point at which 50% of the weight loss is achieved), the theoretical weight loss and the practical weight loss.

| Example | Product from Example | Decomposition temperature | Weight loss (theoretical) | Weight loss (practical) |
|---------|---------------------|---------------------------|---------------------------|-------------------------|
| 39 | 3 | 211.9° C. | 48.9% | 47.3% |
| 40 | 4 | 186.6° C. | 50.6% | 49.9% |
| 41 | 5 | 174.9° C. | 47.2% | 37.3% |
| 42 | 6 | 185.2° C. | 44.2% | 42.6% |

-continued

| Example | Product from Example | Decomposition temperature | Weight loss (theoretical) | Weight loss (practical) |
|---|---|---|---|---|
| 43 | 7 | 162.2° C. | 21.0% | 22.8% |
| 44 | 10 | 172.7° C. | 47.4% | 46.7% |
| 45 | 11 | 193.9° C. | 50.7% | 46.6% |
| 46 | 12 | 186.6° C. | 46.5% | 46.6% |
| 47 | 14 | 218.6° C. | 28.4% | 27.1% |
| 48 | 15 | 231.3° C. | 40.2% | 39.8% |
| 49 | 19 | 198.5° C. | 44.0% | 43.2% |
| 50 | 20 | 171.5° C. | 34.7% | 30.9% |
| 51 | 21 | 172.8° C. | 35.2% | 31.8% |
| 52 | 22 | 173.2° C. | 31.1% | 34.2% |
| 53 | 23 | 182.0° C. | 39.4% | 37.4% |
| 54 | 24 | 156.8° C. | 34.0% | 38.2% |
| 55 | 25 | 190.0° C. | 27.4% | 29.3% |
| 56 | 26 | 178.7° C. | 43.0% | 43.4% |
| 57 | 27 | 175.0° C. | 54.7% | 52.1% |
| 58 | 28 | 178.3° C. | 49.4% | 44.5% |
| 59 | 29 | 186.7° C. | 60.8% | 60.4% |
| 60 | 30 | 186.1° C. | 33.1% | 29.4% |
| 61 | 31 | 215.5° C. | 29.0% | 31.9% |
| 62 | 32 | 182.9° C. | 43.2% | 45.2% |
| 63 | 33 | 206.0° C. | 50.3% | 43.9% |
| 64 | 35 | 187.5° C. | 52.7% | 49.1% |

-continued

| Example | Product from Example | Decomposition temperature | Weight loss (theoretical) | Weight loss (practical) |
|---|---|---|---|---|
| 65 | 36 | 182.9° C. | 46.0% | 42.3% |
| 66 | 37 | 170.0° C. | 46.2% | 42.3% |

EXAMPLE 67

A formulation, prepared by dissolution of 2.5 g of ™Maruka Lyncur PHM-C uzen Petrochemical Co. Ltd., hydroxylated polyhydroxystyrene resin, 9% hydroxy groups, $M_n=2'700$, $M_w=5'300$), 0.60 g of ™Cymel 300 (Cyanamid) and 1.0 g of the product according to Example 3 in 1.0 g of cyclopentanone, is spin-coated onto a glass plate at 1000 rev/min. The glass plate is then heated on a heating plate for 1 min at 200° C. The absorption spectrum is measured before and after thermal treatment:

| λ [nm] | A (fresh) | A (heated) | λ [nm] | A (fresh) | A (heated) | λ [nm] | A (fresh) | A (heated) |
|---|---|---|---|---|---|---|---|---|
| 410 | 0.25 | 0.19 | 510 | 1.70 | 1.13 | 610 | 0.57 | 1.91 |
| 420 | 0.24 | 0.17 | 520 | 2.17 | 1.44 | 620 | 0.25 | 1.70 |
| 430 | 0.25 | 0.17 | 530 | 2.37 | 1.75 | 630 | 0.11 | 1.40 |
| 440 | 0.31 | 0.20 | 540 | 2.15 | 1.93 | 640 | 0.03 | 1.07 |
| 450 | 0.40 | 0.24 | 550 | 2.29 | 2.14 | 650 | 0.01 | 0.75 |
| 460 | 0.51 | 0.30 | 560 | 2.44 | 2.25 | 660 | 0.00 | 0.50 |
| 470 | 0.66 | 0.39 | 570 | 2.47 | 2.27 | 670 | | 0.32 |
| 480 | 0.89 | 0.51 | 580 | 2.34 | 2.22 | 680 | | 0.19 |
| 490 | 1.10 | 0.67 | 590 | 1.84 | 2.14 | 690 | | 0.12 |
| 500 | 1.32 | 0.87 | 600 | 1.13 | 2.04 | 700 | | 0.08 |

EXAMPLE 68

A procedure analogous to Example 67 is carried out, but the product according to Example 10 is used instead of the product according to Example 3:

| λ [nm] | A (fresh) | A (heated) | λ [nm] | A (fresh) | A (heated) | λ [nm] | A (fresh) | A (heated) |
|---|---|---|---|---|---|---|---|---|
| 410 | 2.36 | 0.79 | 510 | 0.05 | 1.92 | 610 | | 0.29 |
| 420 | ≧2.5 | 0.92 | 520 | 0.02 | 2.08 | 620 | | 0.26 |
| 430 | ≧2.5 | 1.06 | 530 | 0.00 | 2.33 | 630 | | 0.23 |
| 440 | ≧2.5 | 1.23 | 540 | | 2.19 | 640 | | 0.21 |
| 450 | ≧2.5 | 1.40 | 550 | | 2.04 | 650 | | 0.19 |
| 460 | ≧2.5 | 1.52 | 560 | | 1.56 | 660 | | 0.18 |
| 470 | 1.88 | 1.65 | 570 | | 1.02 | 670 | | 0.17 |
| 480 | 1.04 | 1.82 | 580 | | 0.64 | 680 | | 0.16 |
| 490 | 0.45 | 1.95 | 590 | | 0.43 | 690 | | 0.15 |
| 500 | 0.16 | 1.93 | 600 | | 0.33 | 700 | | 0.14 |

What is claimed is:

1. A compound of formula

 (I), wherein x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series that is bonded to x groups B via one or more hetero atoms, those hetero atoms being selected from the group consisting of N, O and S and forming part of the radical A, each group B independently of any other(s) is hydrogen or a group of the formula

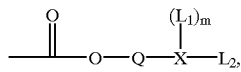

at least one group B being a group of the formula

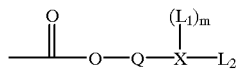

wherein

Q is p,q-$C_2$–$C_{12}$alkylene that is unsubstituted or mono- or poly-substituted by $C_1$–$C_{12}$alkoxy, $C_1$–$C_{12}$alkylthio or by $C_2$–$C_{24}$dialkylamino, p and q being different position numbers, X is a hetero atom selected from the group consisting of N, O and S, m being the number 0 when X is O or S and m being the number 1 when X is N, and $L_1$ and $L_2$ are each independently of the other [—(p',q-$C_2$–$C_{12}$alkylene)-Z—]$_n$—$C_1$–$C_{12}$alkyl or $C_1$–$C_{12}$alkyl that is unsubstituted or mono- or poly-substituted by $C_1$–$C_{12}$alkoxy, $C_1$–$C_{12}$alkylthio, $C_2$–$C_{24}$dialkylamino, $C_6$–$C_{12}$aryloxy, $C_6$–$C_{12}$arylthio, $C_7$–$C_{24}$arylalkylamino or by $C_{12}$–$C_{24}$diarylamino, wherein n is a number from 1 to 1000, p' and q' are different position numbers, each Z independently of any other(s) is a hetero atom O, S or $C_1$–$C_{12}$alkyl-substituted N, and $C_2$–$C_{12}$alkylene in the repeating units [—$C_2$–$C_{12}$alkylene-Z—] may be identical or different, and $L_1$ and $L_2$ may be saturated or one- to ten-fold unsaturated, uninterrupted or interrupted at any desired points by from 1 to 10 groups selected from the group consisting of —(C═O)— and —$C_6H_4$—, and may carry no substituents or may carry from 1 to 10 further substituents selected from the group consisting of halogen, cyano and nitro, with the proviso that when —Q— is —$(CH_2)_r$—, wherein r is a number from 2 to 12, and X is S, $L_2$ may not be unsubstituted, saturated and uninterrupted $C_1$–$C_4$alkyl.

2. A compound of formula (I) according to claim 1, wherein Q is $C_4$–$C_{12}$alkylene in which the carbon atom bonded to the chromophore radical via oxycarbonyl is tertiary.

3. A compound of formula (I) according to claim 1, wherein Q is $C_2$–$C_4$alkylene or wherein $L_1$ and $L_2$ are [—$C_2$–$C_{12}$alkylene-Z—]$_n$—$C_1$–$C_{12}$alkyl or are $C_1$–$C_{12}$alkyl that is mono- or poly-substituted by $C_1$–$C_{12}$alkoxy, $C_1$–$C_{12}$alkylthio or by $C_2$–$C_{24}$dialkylamino.

4. A compound according to claim 1 selected from the group consisting of a) perylenecarboxylic acid imides of formula

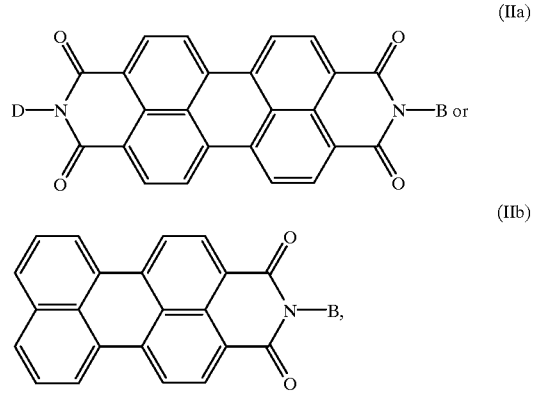

wherein D is hydrogen, $C_1$–$C_6$alkyl, unsubstituted or halo- or $C_1$–$C_6$alkyl-substituted phenyl, benzyl or phenethyl, or is B, b) quinacridones of formula

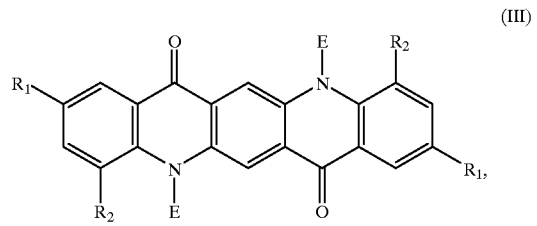

wherein $R_1$ and $R_2$ are each independently of the other hydrogen, halogen, $C_1$–$C_{24}$alkyl, $C_1$–$C_6$alkoxy or phenyl, c) dioxazines of formula

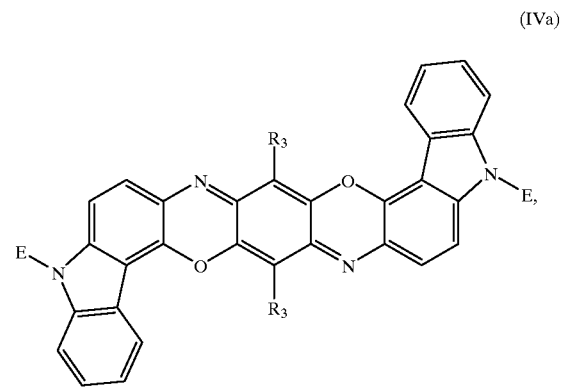

wherein $R_3$ is hydrogen, halogen or $C_1$–$C_{24}$alkyl, or of formula

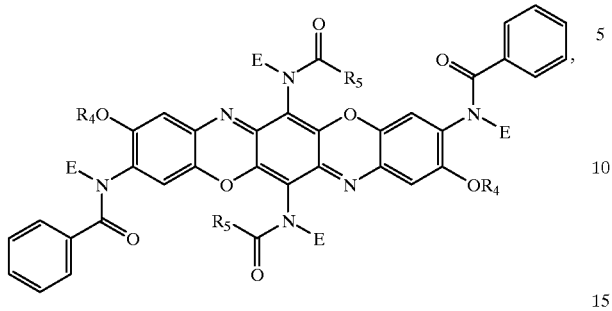

(IVb)

wherein $R_4$ and $R_5$ are each independently of the other $C_1$–$C_4$alkyl, d) isoindolines of formula

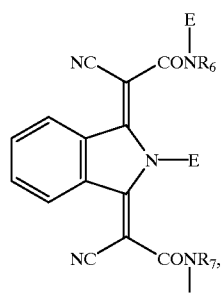

(V)

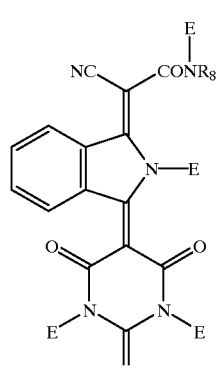

(VI)

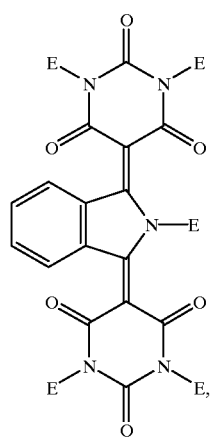

(VII)

wherein $R_6$ is a group

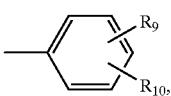

$R_7$ is hydrogen, $C_1$–$C_{24}$alkyl, benzyl or a group

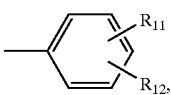

$R_8$ is hydrogen, E or $R_6$, $R_9 R_{10}$, $R_{11}$ and $R_{12}$ are each independently of the others hydrogen, $C_1$–$C_{24}$alkyl, $C_1$–$C_6$alkoxy, halogen or trifluoromethyl, e) indigo derivatives of formula

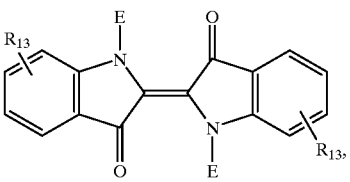

(VIII)

wherein $R_{13}$ is hydrogen, CN, $C_1$–$C_6$alkyl, $C_1$–$C_6$alkoxy or halogen, f) isoindolinones of formula

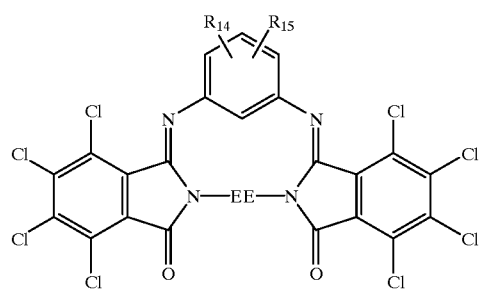

(IXa)

or

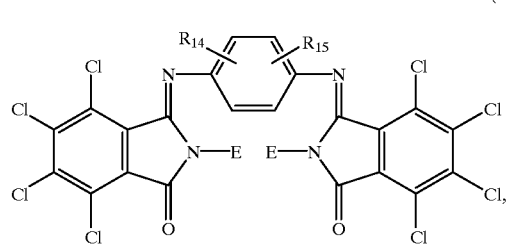

(IXb)

wherein $R_{14}$ and $R_{15}$ are each independently of the other hydrogen, halogen or $C_1$–$C_4$alkyl, g) anthraquinoid compounds of formula

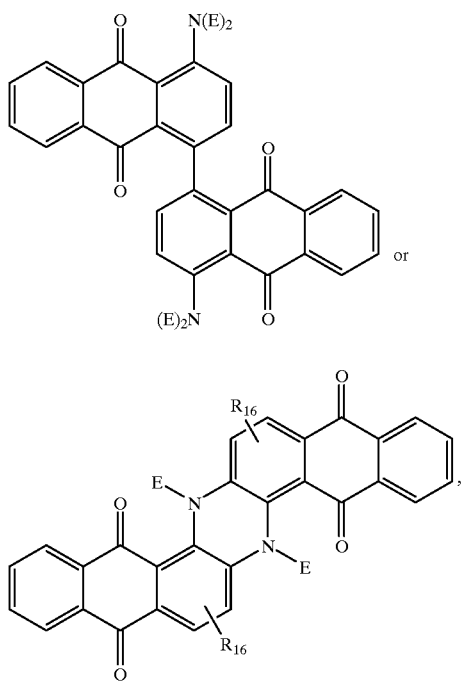

(X)

or (XI)

wherein $R_{16}$ is hydrogen or halogen,
h) phthalocyanines of formula

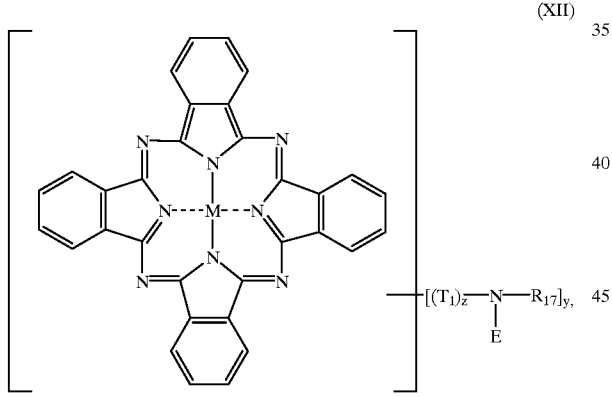

(XII)

wherein
M is $H_2$, a divalent metal selected from the group Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group V(O), Mn(O) and TiO,
$T_1$ is —$CHR_{18}$—, —CO— or —$SO_2$—,
$R_{17}$ is hydrogen, $C_1$–$C_6$alkyl, —N(E)$R_{18}$, N(E)$_2$, —NHCOR$_{19}$, —COR$_{19}$ or

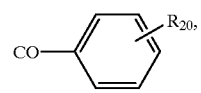

$R_{18}$ is hydrogen or $C_1$–$C_6$alkyl, $R_{19}$ is $C_1$–$C_6$alkyl and $R_{20}$ is hydrogen, halogen, $C_1$–$C_6$alkyl or $C_1$–$C_6$alkoxy, and
z is zero or 1 and y is a number from 1 to 8,
i) pyrrolo[3,4-c]pyrroles of formula

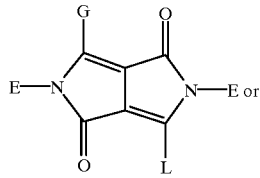

(XIIIa)

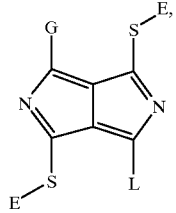

(XIIIb)

wherein G and L are each independently of the other a group of the formula

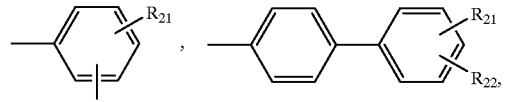

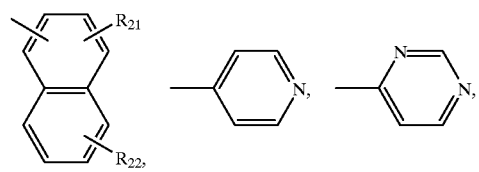

or

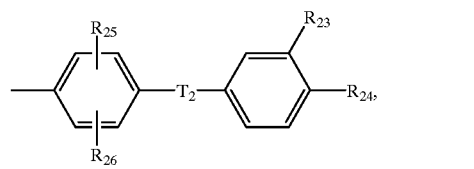

wherein $R_{21}$ and $R_{22}$ are each independently of the other hydrogen, halogen, $C_1$–$C_{24}$alkyl, $C_1$–$C_6$alkoxy, $C_1$–$C_{18}$alkylthio, $C_1$–$C_{18}$alkylamino, cyano, nitro, phenyl, trifluoromethyl, $C_5$–$C_6$cycloalkyl, —C=N—($C_1$–$C_{24}$alkyl),

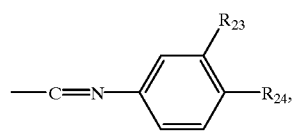

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl,
$T_2$ is —$CH_2$—, —$CH(CH_3)$—, —$C(CH_3)_2$—, —CH=N—, —N=N—, —O—, —S—, —SO—, —SO$_2$— or —NR$_{27}$—, R$_{23}$ and R$_{24}$ are each independently of the other hydrogen, halogen, C$_1$–C$_6$alkyl, C$_1$–C$_6$alkoxy or —CN, R$_{25}$ and R$_{26}$ are each independently of the other hydrogen, halogen or C$_1$–C$_6$alkyl and R$_{27}$ is hydrogen or C$_1$–C$_6$-alkyl, j) quinophthalones of formula

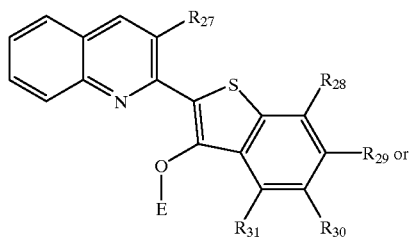

(XIVa)

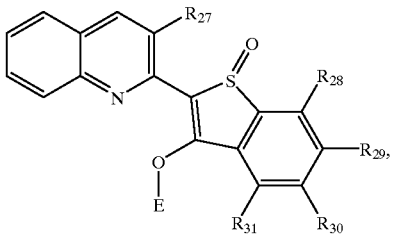

(XIVb)

wherein R$_{27}$ is H or O—E,

R$_{26}$ to R$_{31}$ are each independently of the others hydrogen, halogen, —COO—C$_1$–C$_6$alkyl or —CONH—C$_1$–C$_6$alkyl, k) azo compounds of formula

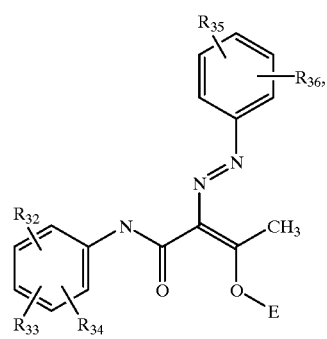

(XVa)

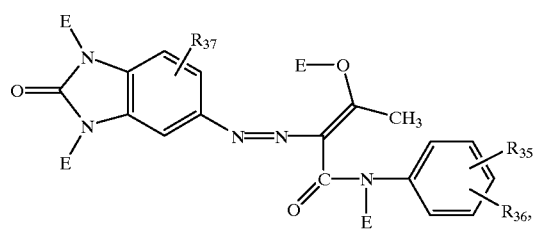

(XVb)

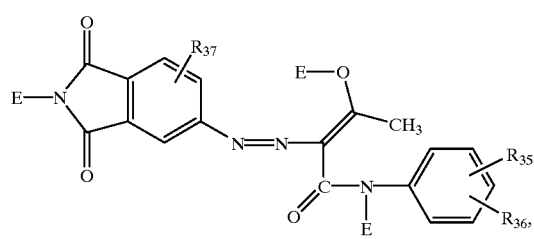

(XVc)

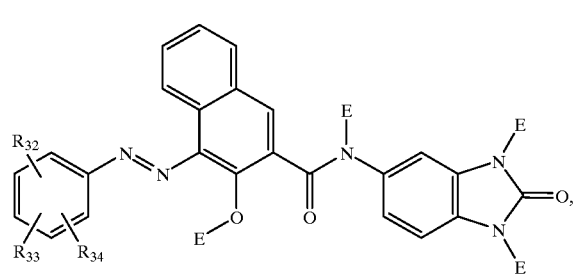

(XVd)

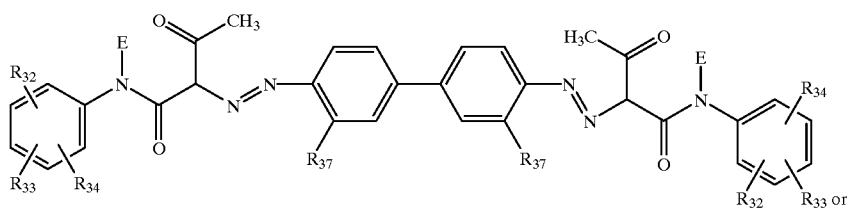
(XVe)

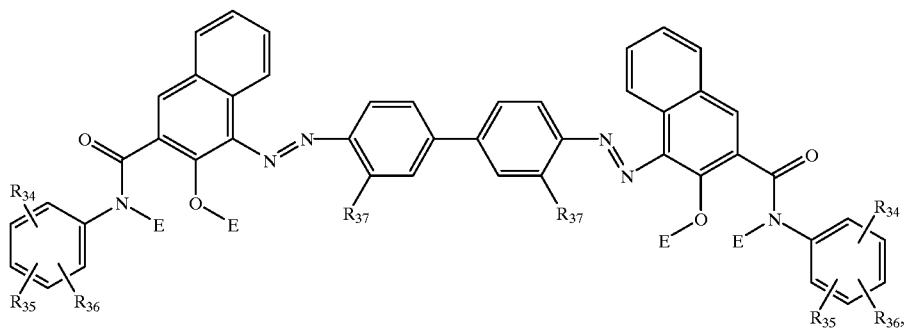
(XVf)

wherein $R_{32}$ to $R_{36}$ are each independently of the others hydrogen, halogen, $C_1$–$C_6$alkyl, $C_1$–$C_6$alkoxy, nitro, acetyl or $SO_2NHC_1$–$C_6$alkyl, and
$R_{37}$ is hydrogen, halogen, $C_1$–$C_6$alkyl or $C_1$–$C_6$alkoxy, and l) anthraquinones of formula

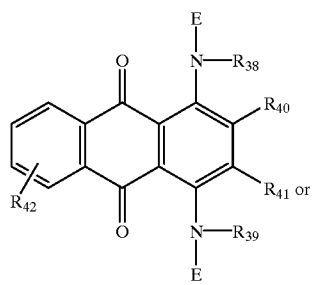
(XVIa)

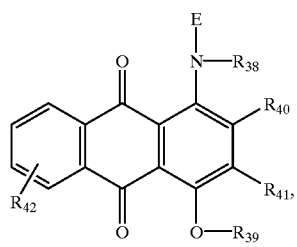
(XVIb)

wherein $R_{38}$ and $R_{39}$ are each independently of the other hydrogen, $C_1$–$C_{12}$alkyl, or $C_6$–$C_{12}$aryl that is unsubstituted or substituted by halogen, $C_1$–$C_6$alkyl, $C_1$–$C_6$alkoxy, nitro, acetyl, $SO_2NHC_1$–$C_6$alkyl or by $SO_2NH_2$, $R_{40}$ and $R_{41}$ are each independently of the other hydrogen, halogen, $C_1$–$C_6$alkyl, $C_1$–$C_6$alkoxy, nitro, cyano, $CONH_2$, $SO_2NHC_1$–$C_6$alkyl, $SO_2NH_2$, $SO_3H$, $SO_3Na$, or $C_6$–$C_{12}$aryl that is unsubstituted or substituted by halogen, $C_1$–$C_6$alkyl, $C_1$–$C_6$alkoxy, nitro, acetyl, $SO_2NHC_1$–$C_6$alkyl or by $SO_2NH_2$, and $R_{42}$ is hydrogen, halogen, nitro, cyano, hydroxy or $C_1$–$C_6$alkoxy, E in the above-mentioned formulae being in each case hydrogen or B, with the proviso that at least one E in each formula is B, and B is as defined above.

5. A compound of formula (I) according to claim 1, wherein A is the chromophore radical of a pirgment $A(H)_x$ selected from the group consisting of Colour Index Pigment Yellow 13, Pigment Yellow 73, Pigment Yellow 74, Pigment Yellow 83, Pigment Yellow 93, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 37, 3,6-di(4'-cyano-phenyl)-2,5-dihydro-pyrrolo[3,4-c]pyrrole-1,4-dione and 3-phenyl-6-(4'-tert-butyl-phenyl)-2,5-dihydro-pyrrolo[3,4-c]pyrrole-1,4-dione, A and x being as defined in claim 1.

6. A high-molecular-weight organic material comprising in its mass a compound of formula I according to claim 1.

7. A high-molecular-weight organic material comprising in its mass a pigment of formula $A(H)_x$, wherein A and x are as defined in claim 1, produced in situ by thermal degradation of a soluble compound of formula I according to claim 1.

8. A thermo-, photo- or chemo-sensitive recording material comprising a compound of formula I according to claim 1.

9. A light-sensitive negative or positive resist composition comprising a soluble compound of formula I according to claim 1.

10. An ink composition for ink-jet printing, comprising a soluble compound of formula I according to claim 1.

11. A colour tape for thermal transfer printing, comprising a soluble compound of formula I according to claim 1.

12. A process for the preparation of mixed crystals or for the crystal modification conversion of chromophores of formula $A(H)_x$ by conversion into compounds of formula I according to claim 1 and thermal treatment of the resulting compounds of formula I at temperatures of from 100 to 170° C.

* * * * *